US007824290B1

(12) United States Patent
Brookins

(10) Patent No.: US 7,824,290 B1
(45) Date of Patent: Nov. 2, 2010

(54) ROTATIONAL POWER DISTRIBUTION AND CONTROL SYSTEM

(76) Inventor: Ernie Brookins, 913 W. Main Ave., West Fargo, ND (US) 58078

( * ) Notice: Subject to any disclaimer, the term of this patent is extended or adjusted under 35 U.S.C. 154(b) by 494 days.

(21) Appl. No.: 11/830,067

(22) Filed: Jul. 30, 2007

Related U.S. Application Data

(60) Provisional application No. 60/820,923, filed on Jul. 31, 2006, provisional application No. 60/827,627, filed on Sep. 29, 2006.

(51) Int. Cl.
F16H 47/08 (2006.01)
(52) U.S. Cl. .................................. 475/107
(58) Field of Classification Search ............ None
See application file for complete search history.

(56) References Cited

U.S. PATENT DOCUMENTS

| | | | | |
|---|---|---|---|---|
| 1,446,392 A * | 2/1923 | Morrison | ............ | 475/93 |
| 1,789,879 A * | 1/1931 | Paige | ............ | 475/94 |
| 1,924,941 A * | 8/1933 | Josephsen | ............ | 475/93 |
| 2,102,131 A * | 12/1937 | Schmid | ............ | 475/93 |
| 2,392,226 A * | 1/1946 | Butterworth, Jr. et al. | | 242/412.3 |
| 2,651,218 A * | 9/1953 | Morris | ............ | 475/93 |
| 2,653,487 A * | 9/1953 | Martin et al. | ............ | 477/51 |
| 3,397,597 A * | 8/1968 | Szekely | ............ | 475/107 |
| 3,447,400 A * | 6/1969 | Serniuk | ............ | 475/107 |
| 3,540,296 A * | 11/1970 | Hostutler | ............ | 74/15.4 |
| 4,729,261 A * | 3/1988 | Tervola | ............ | 475/94 |
| RE34,209 E * | 3/1993 | McGarraugh | ............ | 475/89 |
| 6,135,909 A * | 10/2000 | Keiser | ............ | 475/107 |
| 6,544,137 B2 * | 4/2003 | Duan | ............ | 475/89 |
| 6,634,976 B1 * | 10/2003 | Britt | ............ | 475/91 |
| 6,702,701 B2 * | 3/2004 | Phelan et al. | ............ | 475/91 |

* cited by examiner

Primary Examiner—Dirk Wright
(74) Attorney, Agent, or Firm—David A. Lingbeck

(57) ABSTRACT

Rotational power distribution and control systems and components thereof along with related methods are disclosed. The rotational power distribution and control system may, for example, be operable to function similarly to a typical automotive manual clutch. Other embodiments of the rotational power distribution and control system may function as continuously or infinitely variable transmissions. Still further embodiments of the rotational power distribution and control system may function as hybrid drive systems for various types of vehicles, including automobiles, trucks and busses. The rotational power distribution and control system includes at least one hydrostatic pump/motor and a rotational power dividing apparatus.

10 Claims, 11 Drawing Sheets

ROTATIONAL POWER DISTRIBUTION AND CONTROL SYSTEM

RELATED APPLICATIONS

This application claims priority from U.S. Provisional Patent Application Ser. No. 60/820,923, filed Jul. 31, 2006, entitled "Rotational Power Distribution And Control System," and the entire disclosure of which is incorporated by reference in its entirety herein. This application also claims priority from U.S. Provisional Patent Application Ser. No. 60/827,627, filed Sep. 29, 2006, entitled "Rotational Power Distribution And Control System," and the entire disclosure of which is incorporated by reference in its entirety herein.

FIELD OF THE INVENTION

The present invention generally relates to rotational power distribution and control systems, and more particularly, to gear systems and components using a hydrostatic pump to control rotational output.

BACKGROUND OF THE INVENTION

Recently, in large part due to escalating gasoline prices, there has been an intensified interest in components, systems and apparatuses that are able to increase fuel efficiency in motor vehicles. One area of interest has been the production of more fuel-efficient engines and unique drive trains, which allow these more fuel-efficient engines to generally operate over a narrower band of rotational speeds. Recently, major automobile manufacturers such as Nissan and Toyota have offered vehicles with Continuously Variable Transmissions (CVTs) and gas/electric hybrid drive trains. Both such systems allow the internal combustion engine powering the vehicle to operate over relatively narrow ranges, which in turn allows engine designers to design those engines for maximum efficiency within those relatively narrow ranges.

A significant operational requirement of an automotive drive train is typically to be operable to connect and disconnect an internal combustion engine from the rest of the drive train. In vehicles with typical manual transmissions, this function is performed by a manual clutch. When a vehicle operator depresses a clutch pedal, a pressure plate is moved away from a clutch disc and flywheel, thereby disconnecting the drive train from the internal combustion engine. When the clutch pedal is released, the pressure plate moves toward the flywheel, sandwiching the clutch between the pressure plate and the flywheel. Friction between the pressure plate, clutch, and flywheel eventually brings the components together in common rotation. However, between the disconnected state and the common rotation state, the components may be in contact but not rotating at a common speed. During this period of slippage, heat is generated. The generated heat is unrecoverable energy loss. In an automatic transmission, the function of connecting and disconnecting the internal combustion engine is performed by a torque converter. The torque converter uses a fluid coupling as the disconnect mechanism. The torque converter also allows slippage and heat is generated within the fluid of the torque converter. Typically, this fluid is cooled through a transmission fluid cooler, and again, the heat generated is unrecovered energy loss.

Typical internal combustion engines are designed to operate over a relatively large range of rotational speeds. This is to enable the engine to power the vehicle in a wide variety of conditions, which include starting from a standing stop, accelerating at various rates, and high-speed cruising. However, internal combustion engines can be made more efficient if they are designed to operate over a narrow band of rotational speeds. Hence, design trade-offs have typically been made between efficiency over a narrow range of rotational speeds and adequate power over a wide range of rotational speeds.

To ease the impact of the aforementioned internal combustion engine design trade-offs, automotive designers have increased the number of gear ratios present in the typical automotive vehicle. Today, five-speed automatic transmissions and six-speed manual transmissions are not uncommon. However, these transmissions are more complex and require more shifting to maintain the internal combustion engines within their optimal ranges of rotational speeds.

To further control the range of rotational speeds at which internal combustion engines must typically operate, many automotive manufacturers offer CVTs. These CVTs may, under some circumstances, allow the internal combustion engine to operate at a particular rotational speed while the transmission continuously varies its gear ratio to accommodate varying vehicle speeds. This allows the internal combustion engines to operate over an even narrower range of rotational speeds, which in turn allows engine designers to optimize the engine for operation within that narrower range.

Recently, gas/electric hybrid vehicles, such as Toyota's Prius®, have been offered for sale. One advantage of a gas/electric hybrid vehicle is that the internal combustion engine may be operated at very specific rotational speeds, and therefore engine efficiency can be maximized for operation at those rotational speeds. By adding an electrical energy storage device such as a battery, gas/electric hybrids are also able to recapture some of the kinetic energy of the vehicle by operating the electric motors as generators during braking, which generates electricity that is then stored in the battery. This is known as regenerative braking, and the stored energy is available to power the vehicle under certain conditions. The battery also may supply power during peak demand periods, such as hard acceleration. This in turn allows the internal combustion engine to be relatively smaller than what would typically be required for the size of vehicle in which it is installed since its peak power output will be supplemented by energy from the battery. This in turn leads to even greater fuel efficiency.

Gas/electric hybrid systems are generally more expensive than traditional internal combustion engine drive trains. The batteries used in gas/electric hybrid systems are generally expensive and heavy. There are also safety concerns with the electrical systems in these vehicles; some of which operate at 500 V. Gas/electric hybrid technology is generally only available in vehicles specifically designed to take advantage of the technology, which in general means that only new vehicles feature the technology and retrofitting existing vehicles may be relatively expensive.

SUMMARY OF THE INVENTION

It has been recognized that there still exists a need for vehicle components and systems that would allow a broad range of vehicles, including personal vehicles, buses, and commercial trucks, to operate at peak efficiencies. There also exists a need for components that enable any size vehicle to take advantage of regenerative braking and other energy efficient aspects of hybrid vehicle design. It has also been recognized that it would be beneficial to develop components and systems that may be installed in existing vehicles to allow these vehicles to take advantage of fuel saving technologies such as continuously variable transmissions, regenerative braking and hybrid drive trains. Accordingly, the present invention is generally embodied by a rotational power distribution and control system that provides a continuously variable link between a rotational input and a rotational output in the form of a rotational power distribution and control device. Additionally, the rotational power distribution and control device may be incorporated into a system that is operable to function as a continuously variable transmission. The rotational power distribution and control device may also be incorporated into systems that are operable to function as hybrid drive trains.

The first aspect of the present invention is embodied by a rotational power distribution and control system that includes a gear set, a hydrostatic pump, a hydraulic fluid circuit, and a valve. Generally, the gear set may be in the form of either a planetary gear set or a differential gear set. The gear set includes a first, second and third rotational interface. The hydrostatic pump may be coupled to a selected rotational interface in the form of any of the three rotational interfaces.

"Coupled," as used throughout this specification and claims, refers to components that may be: rigidly interconnected (e.g., a gear rigidly affixed to a rotating shaft so the two components rotate in unison); interconnected in a non-rigid, fixed-ratio relationship (e.g., a gear train where the ratio of rotation of any particular gear to rotation of any other gear in the train is fixed); interconnected through a power transfer mechanism that is disposed outside of the continuously variable connection (i.e. the continuously variable connection in the form of the planetary gear set or the differential gear set); or interconnected through a combination thereof. Accordingly, "coupled" as used herein does not include components interconnected through a planetary gear set or a differential gear set.

Returning to the first aspect, the hydrostatic pump may also be interconnected to the hydraulic fluid circuit through at least a first port and a second port of the hydrostatic pump. The valve may be interconnected to at least the first port of the hydrostatic pump and be operable to selectively control the flow of hydraulic fluid through at least the first port.

Various refinements exist of the features noted in relation to the subject first aspect of the present invention. Further features may also be incorporated in the subject first aspect of the present invention as well. These refinements and additional features may exist individually or in any combination. The hydrostatic pump may include a plurality of reciprocating pistons. In one embodiment of the first aspect, the hydrostatic pump is in axial piston pump. The axial piston pump may contain a plurality of axially reciprocating pistons slidably disposed within a plurality of axial bores within a rotating cylinder block. The plurality of pistons may interface with a swash plate as the cylinder block rotates. The swash plate may be angled to create the reciprocating motion of the pistons. In a related embodiment, the angle of the swash plate may be adjustable. By adjusting the angle of the swash plate, the strokes of the plurality of pistons may be adjusted. In another embodiment of the first aspect, the hydrostatic pump is a radial piston pump.

A charge pump may be interconnected to the hydraulic fluid circuit and be operable to supply hydraulic fluid under pressure to at least one of the ports on the hydrostatic pump. The charge pump may be interconnected so as to ensure that a predetermined level of pressure may be present at each of the ports on the hydrostatic pump. The hydraulic fluid circuit may be a closed fluid circuit in that none of the passages or components containing hydraulic fluid may be open to the surrounding environment and the hydraulic fluid may be completely contained within the hydraulic fluid circuit. In one embodiment, the hydrostatic pump may include a leaked fluid return path, wherein the leaked fluid return path may be operable to collect hydraulic fluid from within a housing of the hydrostatic pump and return that hydraulic fluid to the hydraulic fluid circuit. The hydraulic fluid within the hydraulic fluid circuit may be any appropriate type of hydraulic fluid known to those skilled in the art. Other types of fluids may be substituted for the hydraulic fluid. In one embodiment, the fluid may be a grade of diesel oil suitable for such an application. In another embodiment, the fluid may be any fluid with a lubricant (e.g., a coolant with a lubricating base and water based fluids).

The valve may be operable to substantially prevent flow from the first port on the hydrostatic pump. Since the hydraulic fluid may be substantially incompressible, if hydraulic fluid is prevented from flowing out of the hydrostatic pump through the first port, hydraulic fluid within the axial bores of pistons that are undergoing a compression stroke may not be able to exit those axial bores, and therefore the pistons may be substantially prevented from completing their respective compression strokes. This in turn may substantially prevent rotation of the cylinder block of the hydrostatic pump, which in turn may prevent the rotation of the rotational interface to which the hydrostatic pump may be coupled. Moreover, the valve may be operable to selectively regulate flow through the first port on the hydrostatic pump. By selectively regulating the volume of flow that may flow through the first port, the resistance of the hydraulic fluid to the compression stroke of the pistons may be correspondingly adjusted. The pistons undergoing the compression stroke may, in turn, impart a resistance to the rotation of the rotational interface to which the hydrostatic pump may be coupled. This resistance may result in a change in the ratio of rotational speeds between the second rotational interface and the third rotational interface.

In another embodiment of the first aspect, wherein the gear set is a planetary gear set, the first rotational interface may be a planetary carrier, the second rotational interface may be a sun gear, and the third rotational interface may be a ring gear. In this embodiment, the above-noted cylinder block of the hydrostatic pump may be coupled to the third rotational interface and therefore may be coupled to the ring gear of the planetary gear set. Furthermore, the first rotational interface may be coupled to a rotational power source and the second rotational interface may serve as a rotational output of the rotational power distribution and control system. Alternatively, any of the three main components of the planetary gear set (i.e., the planetary carrier, the sun gear, and the ring gear) may be coupled to any of: the hydrostatic pump, the rotational power source, and the output of the rotational power distribution and control system.

In the embodiment where the cylinder block of the hydrostatic pump may be coupled to the ring gear, the first rotational interface may be coupled to a rotational power source and the second rotational interface may be the rotational output of the rotational power distribution and control system. The hydrostatic pump may be an axial piston pump where the first rotational interface is a first shaft extending through opposing ends of the hydrostatic pump and is rotatable relative to the hydrostatic pump. Furthermore, the second rotational interface may be a second shaft, collinear with the first shaft, and the third rotational interface may be a hollow shaft, coaxial with and surrounding the first shaft, that may be coupled with the cylinder block of the hydrostatic pump.

In another embodiment of the first aspect, the gear set may be a differential gear set that includes a carrier that may be coupled to the first rotational interface, a first side gear that may be coupled to the second rotational interface and a second side gear that may be coupled to a third rotational interface. The cylinder block of the hydrostatic pump may be coupled to one of the side gears. Similar to as described above with respect to the embodiment including a planetary gear set, in the present embodiment, any of the three main components of the differential gear set (i.e., the carrier, the first side gear, and the second side gear) may be coupled to any of: the hydrostatic pump, the rotational power source, and the output of the rotational power distribution and control system.

A second aspect of the present invention is embodied by a rotational power distribution and control system that includes a gear set, a first rotational interface that may be coupled to a hydrostatic pump, a second rotational interface that may be coupled to a rotational input, a third rotational interface that may be coupled to a rotational output, a hydrostatic motor that may be coupled to the third rotational interface, and a hydraulic fluid circuit. Generally, the gear set may be in the form of either a planetary gear set or a differential gear set and the hydraulic fluid circuit is interconnected to the hydrostatic pump and the hydrostatic motor. The second aspect may be operable to function as a CVT, as components within a hybrid drive train, or any combination thereof. The hydrostatic pump may be operable as a hydrostatic motor and the hydrostatic motor may be operable as a hydrostatic pump.

Various refinements exist of the features noted in relation to the subject second aspect of the present invention. Further features may also be incorporated in the subject second aspect of the present invention as well. These refinements and additional features may exist individually or in any combination. In one embodiment of the second aspect, the rotational power distribution and control system further includes an energy storage apparatus interconnected to the hydraulic fluid circuit. The energy storage apparatus may be operable to store energy delivered from the hydrostatic pump, the hydrostatic motor, or any combination thereof. The delivery of energy may be in the form of hydraulic fluid flow.

The above-noted energy storage apparatus may be an accumulator, such as a piston-type or bladder-type accumulator known to those skilled in the art. The energy storage apparatus also may be of a configuration that includes at least one hydraulic cylinder (e.g., a first hydraulic cylinder) interconnected to the hydraulic fluid circuit and at least one pneumatic cylinder (e.g., a first pneumatic cylinder). Both the first hydraulic cylinder and first pneumatic cylinder of the present aspect may be two-way cylinders. The first hydraulic cylinder may be mechanically interconnected to the first pneumatic cylinder so that movement of a piston (or pistons) of the first hydraulic cylinder is linked to movement of a piston (or pistons) of the first pneumatic cylinder. This mechanical interconnection may, for example, be accomplished by mechanically linking the cylinder rods of the cylinders.

The above-noted energy storage apparatus may further include a pneumatic circuit. The pneumatic circuit may be pneumatically interconnected to a first end and a second end of the first pneumatic cylinder. Furthermore, the pneumatic circuit may be pneumatically interconnected to a first gas storage device and a second gas storage device. The pneumatic circuit may be operable to pneumatically interconnect either the first end or the second end of the first pneumatic cylinder to either of the first gas storage device or the second gas storage device. The pneumatic circuit, the first pneumatic cylinder, and the first and second gas storage devices may contain nitrogen as the operating gas, although any appropriate gas may be utilized.

The above-noted energy storage apparatus also may be operable to store and release energy. To store energy, a hydraulic fluid flow may be introduced to the first hydraulic cylinder. This in turn may result in movement of the piston (or pistons) of the first hydraulic cylinder, which will in turn result in movement of the piston (or pistons) of the first pneumatic cylinder. The pneumatic circuit may interconnect the end of the first pneumatic cylinder experiencing compression (due to the movement of its piston or pistons) to one of the gas storage devices, which in this example may be operating as a high-pressure gas storage device. In this manner, energy from the hydraulic fluid flow may be stored in the form of pressurized gas.

To release energy, the high-pressure gas storage device may be interconnected to one end of the first pneumatic cylinder, which may cause movement of the piston (or pistons) of the first pneumatic cylinder. This in turn may result in movement of the piston (or pistons) of the first hydraulic cylinder, which in turn may cause hydraulic fluid to flow out of the first hydraulic cylinder. The hydraulic fluid circuit may direct this flow of hydraulic fluid to a hydrostatic pump, a hydrostatic motor, or a combination thereof to at least partially power a vehicle or perform any other appropriate function.

A third aspect of the present invention is embodied by a rotational power distribution and control system that includes a gear set, a hydrostatic pump, a rotational input, a rotational output, a hydraulic energy storage apparatus, and a hydraulic fluid circuit. Generally, the gear set may be in the form of either a planetary gear set or a differential gear set. The gear set includes a first, second and third rotational interface. The hydrostatic pump may be coupled to the first rotational interface. The hydrostatic pump may be operable to function both as a pump and as a motor. The rotational input may be coupled to the second rotational interface. The rotational output may be coupled to the third rotational interface.

Various refinements exist of the features noted in relation to the subject third aspect of the present invention. Further features may also be incorporated in the subject third aspect of the present invention as well. These refinements and additional features may exist individually or in any combination. The hydraulic energy storage apparatus of the third aspect is operable to store hydraulic energy delivered to it from the hydrostatic pump. Generally, hydraulic energy is the energy contained within flowing hydraulic fluid. For example, the output flow from the hydrostatic pump contains hydraulic energy, which can be dissipated, stored (e.g., in an energy storage apparatus) or converted into mechanical energy (e.g., through a hydrostatic motor). The hydraulic energy storage apparatus is also operable to release hydraulic energy to the hydrostatic pump to operate the hydrostatic pump as a hydrostatic motor. For example, the hydrostatic motor may be used to power a vehicle. The hydraulic fluid circuit of the third aspect is interconnected to the hydrostatic pump and the hydraulic energy storage apparatus.

In one embodiment of the third aspect, a disconnect mechanism is included to disconnect a rotational power source from the rotational power distribution and control system. In one embodiment, the disconnect mechanism is an elongate shaft having a first end and a second end. The elongate shaft has a recessed portion extending along a portion of the shaft from the second end. The elongate shaft also has a plurality of splines circumferentially spaced about the recessed portion and engaged to the rotational input. The elongate shaft also has a plurality of keys circumferentially spaced about a portion of the elongate shaft at about the first end thereof and being slidably engageable to a rotational power source. The rotational power source may be an internal combustion engine in which case the elongate shaft may be slidably engageable with an impeller fastened to a crankshaft of the internal combustion engine.

In another embodiment of the third aspect, the energy storage apparatus may be an accumulator, such as a piston-type or bladder-type accumulator known to those skilled in the art. The hydraulic energy storage apparatus of the third aspect may be configured similarly to the energy storage apparatus previously discussed with respect to the second aspect.

A fourth aspect of the present invention is embodied by a hydraulic energy storage apparatus for use in a hybrid vehicle that includes at least one hydraulic cylinder (e.g., a first hydraulic cylinder) interconnected to a hydraulic fluid circuit, at least one pneumatic cylinder (e.g., a first pneumatic cylinder) mechanically interconnected to the first hydraulic cylinder, a first pneumatic connection at a first end of the first pneumatic cylinder, a second pneumatic connection at a second end of the first pneumatic cylinder, a first gas storage device, a second gas storage device, and a pneumatic circuit. Both the first hydraulic cylinder and first pneumatic cylinder of the present aspect may be two-way cylinders. The pneumatic circuit is interconnected to the first and second pneumatic connections and the first and second gas storage devices. The pneumatic circuit is operable to interconnect either of the first and second pneumatic connections to either of the first and second gas storage devices.

Various refinements exist of the features noted in relation to the subject fourth aspect of the present invention. Further features may also be incorporated in the subject fourth aspect of the present invention as well. These refinements and additional features may exist individually or in any combination. The first hydraulic cylinder may be mechanically interconnected to the first pneumatic cylinder so that movement of a piston (or pistons) of the first hydraulic cylinder is linked to a piston (or pistons) of the first pneumatic cylinder. This mechanical interconnection may, for example, be accomplished by mechanically linking the cylinder rods of the cylinders or in any other appropriate manner. The pneumatic circuit, at least one pneumatic cylinder, and the first and second gas storage devices may contain nitrogen as the operating gas. The hydraulic energy storage apparatus may be operable to store and release energy in a manner similar to as described above with respect to the energy storage apparatus of the second aspect of the present invention.

A fifth aspect of the present invention is embodied by a method of transmitting rotational power from a rotational power source to a load. The method includes delivering rotational power to a first element of a gear set, wherein a load is connected to a second element of the gear set. This method also includes restricting the hydraulic fluid flow from a hydrostatic pump that may be coupled to a third element of the gear set. The hydrostatic pump includes a plurality of reciprocating pistons. In the present method, the restriction of the hydraulic fluid flow causes a rotational resistance to be applied to the third element of the gear set, which in turn results in a transfer of rotational power from the first element of the gear set to the second element of the gear set.

Various refinements exist of the features noted in relation to the subject fifth aspect of the present invention. Further features may also be incorporated in the subject fifth aspect of the present invention as well. These refinements and additional features may exist individually or in any combination. In one embodiment of the fifth aspect, the gear set is a planetary gear set, and the third element (to which the hydrostatic pump may be coupled) may be a ring gear of the planetary gear set. The first element may be a planetary carrier of the planetary gear set and the second element may be a sun gear of the planetary gear set. Alternatively, the first element may be a sun gear of the planetary gear set and the second element may be a planetary carrier of the planetary gear set.

Similarly, the third element (and therefore the hydrostatic pump) may be inter-connected to the planetary carrier of the planetary gear set. Accordingly, the first element may be a sun gear or ring gear of the planetary gear set and the second element may be the other one of the sun gear or ring gear of the planetary gear set. Finally, the third element may be coupled to the sun gear of the planetary gear set. Accordingly, the first element may be a planetary carrier or ring gear of the planetary gear set and the second element may be the other one of the planetary carrier or ring gear of the planetary gear set.

In another embodiment of the fifth aspect, the method includes selectively directing the restricted flow from the hydrostatic pump to an energy storage apparatus and selectively releasing energy from the energy storage apparatus to the hydrostatic pump.

In another embodiment of the fifth aspect, the method includes selectively directing the restricted flow from the hydrostatic pump to a hydrostatic motor. The hydrostatic motor may be coupled to the load, which may be coupled to the second element. In this embodiment, the directed flow may cause power to be delivered to the load through the hydrostatic motor. The present embodiment may also include selectively directing the restricted flow from the hydrostatic pump to an energy storage apparatus and selectively releasing energy from the energy storage apparatus to the hydrostatic pump, the hydrostatic motor, or any combination thereof.

In another embodiment of the fifth aspect, the gear set is a differential gear set. In this embodiment, the third element of the gear set (to which the hydrostatic pump may be coupled) may be the carrier. The rotational power source may be coupled to either the first side gear or the second side gear. The load may be coupled to the other one of the first side gear or the second side gear. Alternatively, the third element of the gear set may be one of the side gears in which case the rotational power source may be coupled to either the other one of the side gears or the carrier, and the load may be coupled to the other one of the side gears or the carrier not coupled to the rotational power source.

Various refinements exist of the features noted in relation to the aforementioned aspects of the present invention. Further features may also be incorporated in the aforementioned aspects of the present invention as well. These refinements and additional features may exist individually or in any combination. The various features discussed above in relation to each aforementioned aspect of the present invention may be utilized by any of the aforementioned aspects of the present invention as well.

DETAILED DESCRIPTION

Figure 1:
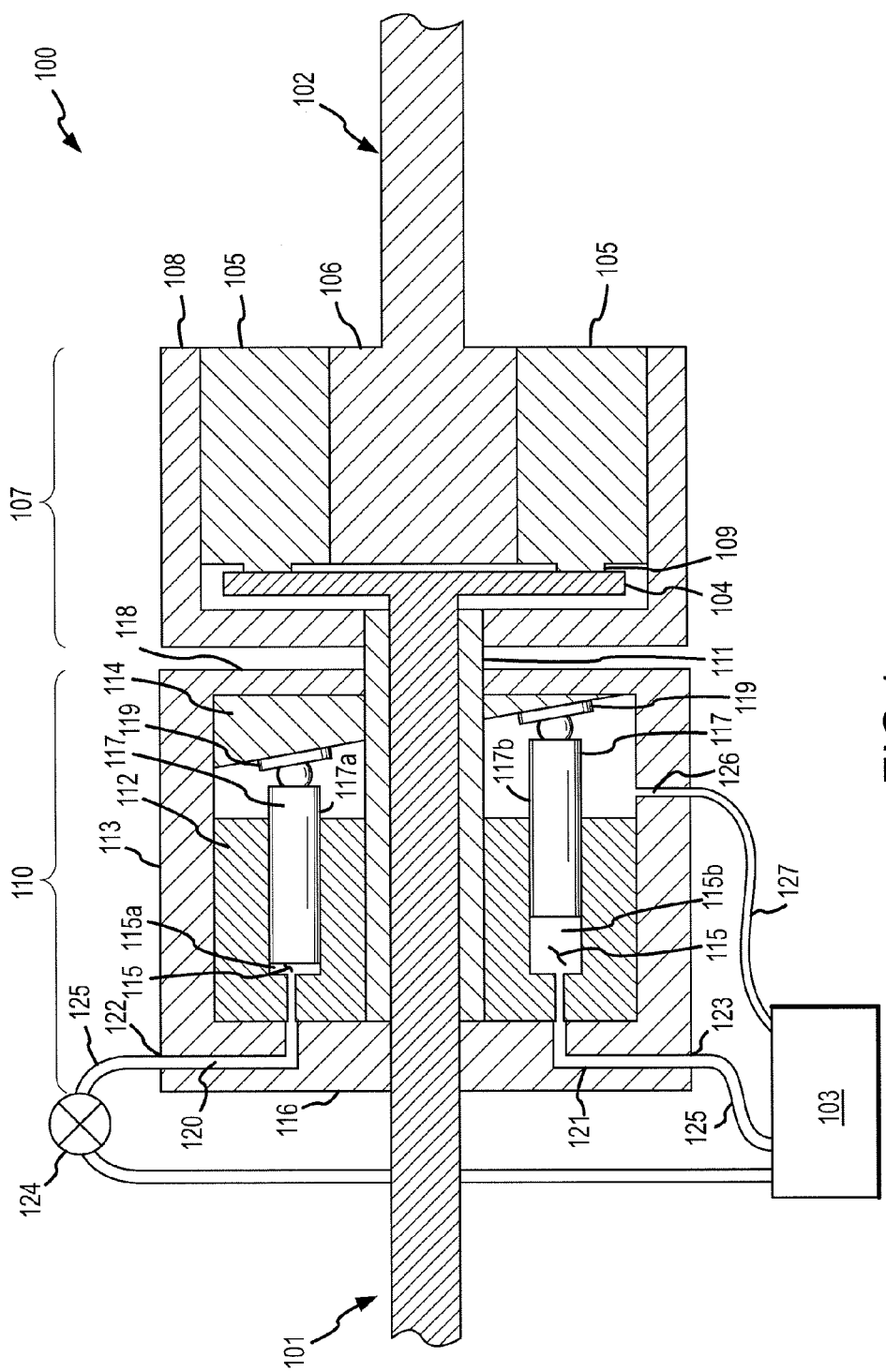
FIG. 1 is a cross-sectional schematic view of one embodiment of a rotational power distribution and control system configured as a hydraulic clutch.

The apparatuses and methods disclosed and claimed herein can be made and executed without undue experimentation in light of the present disclosure. While the apparatuses and methods of this invention have been described in terms of preferred embodiments, it will be apparent to those of skill in the art that variations may be applied to the apparatuses and methods without departing from the concept, spirit and scope of the invention. More specifically, it will be apparent that certain dimensions of the various components making the invention may be varied to achieve the same or similar results. While configurations depicted in the drawings indicate particular component or feature locations, the skilled artisan will recognize that the manner of operation of the invention does not require these locations be precisely as shown. The manner of operation of the invention will not be significantly affected if these locations are not precisely observed and indeed, may be varied to obtain various desired parameters. Thus, all similar substitutes and modifications apparent to those skilled in the art are deemed to be within the spirit, scope and concept of the invention.

The rotational power distribution and control systems described herein are operable to provide a continuously variable rotational output with respect to a rotational input. In this respect, the rotational power distribution and control system may, for example, operate as a rotational power distribution and control device (or "hydraulic clutch"), a continuously variable transmission, a hybrid drive system, or any combination thereof.

For example, an automotive engine may be interconnected to an input of the rotational power distribution and control system and automotive drive train components may be interconnected to an output of the rotational power distribution and control system. The rotational power distribution and control system may be operable to continuously or infinitely vary the ratio of the rotational input from the engine to the rotational output. The drive train components may include one or more drive wheels, axles, differentials, transmissions or other conventional drive train components. Additionally, the rotational power distribution and control system may include a hydraulic fluid circuit. The hydraulic fluid circuit may distribute, store and/or dissipate energy to manipulate the relationship between the input and the output of the rotational power distribution and control system.

For example, the rotational power distribution and control system may be operable to act as a clutch, converting the rotational input into a hydraulic pressure output that may then be dissipated through the hydraulic fluid circuit. In a continuously variable transmission application, the hydraulic pressure output may be used immediately and applied to the rotational output. In a hybrid drive system application, the energy of the hydraulic pressure output may be stored for later use.

The rotational input may be any rotational power source. In applications where the rotational power distribution and control system is installed in a vehicle, the rotational power source may typically be an internal combustion engine (including diesel powered engines). However, other types of rotational power sources may be interconnected to the rotational power distribution and control system. For example, the rotational input may be from a diesel-electric power source (such as those typically used in locomotives) or an electric motor. The rotational input also may be from a single source or from multiple sources (of either the same type or different types) interconnected together.

Generally, the rotational power distribution and control systems described herein include a first rotational interface, a second rotational interface, a third rotational interface that may be coupled to a hydrostatic piston pump, a gear set and a hydraulic fluid circuit. The gear set typically interconnects the first rotational interface, second rotational interface, and third rotational interface to each other. A charge pump may also be present.

In regard to the hydrostatic piston pump coupled to the third rotational interface, and as stated previously, "coupled," as used herein, refers to components that may be: rigidly interconnected; interconnected in a non-rigid, fixed-ratio relationship; interconnected through a power transfer mechanism that is disposed outside of the continuously variable connection; or interconnected through a combination thereof. Accordingly, "coupled" does not include components interconnected through the planetary gear set or the differential gear set.

FIG. 1 is a cross-sectional schematic view of one embodiment of a rotational power distribution and control device 100 or hydraulic clutch. The rotational power distribution and control device 100 generally includes a planetary gear set 107, a hydrostatic pump 110, a first rotational interface in the form of a first shaft 101, a second rotational interface in the form of a second shaft 102, and a hydraulic fluid circuit 103. The planetary gear set 107 includes three main components that correspond to three inputs/outputs: a planetary carrier 104 with a plurality of planetary gears 105, a sun gear 106, and a ring gear 108. Generally, the first shaft 101, second shaft 102, and hydrostatic pump 110 each interface with a different one of the three main components of the planetary gear set 107 (each of the first shaft 101, second shaft 102, and hydrostatic pump 110 may be coupled with any of the planetary carrier 104, the sun gear 106, or the ring gear 108, as desired/required). The hydrostatic pump 110, through the hydraulic fluid circuit 103, may be used to control the rotation of one of the first shaft 101 and the second shaft 102.

For purposes of illustration, the functionality of this particular embodiment will be described in the context of a vehicular application wherein a rotational power source is an input interconnected to the first rotational interface in the form of first shaft 101.

Furthermore, in this exemplary embodiment one or more drive wheels of the vehicle are interconnected as an output to a second rotational interface in the form of second shaft 102. Although both the first shaft 101 and the second shaft 102 are schematically illustrated as single elements in FIG. 1 and in the various embodiments that incorporate the rotational power distribution and control device 100, both the first shaft 101 and the second shaft 102 may each include multiple elements. For example, second shaft 102 interconnecting the sun gear 106 and a transmission may include multiple shafts splined together, universal joints, or any other appropriate interconnection mechanism or mechanisms to rotationally interconnect the sun gear 106 to the input of a transmission.

As stated, the first shaft 101 may serve as an input shaft. In the illustrated embodiment, the first shaft 101 is coupled to the planetary carrier 104 (which carries the set of the plurality of planet gears 105), the second shaft 102 (output) is coupled to the sun gear 106, and the ring gear 108 is coupled to the rotational drive for the hydrostatic pump 110.

As previously stated, the coupled components may be rigidly interconnected, interconnected in a non-rigid, fixed-ratio relationship, interconnected through a power transfer mechanism that is disposed outside of the continuously variable connection, or interconnected through a combination thereof. Generally, coupled components described herein may be disconnected from each other by means known to those skilled in the art, yet still remain within the scope of the invention. For example, in FIG. 1, the second shaft 102 is illustrated as coupled (in the form of being rigidly interconnected) to the sun gear 106. In an alternate configuration, a disconnect mechanism, such as a clutch, may be interposed between the second shaft 102 and the sun gear 106. In such a configuration, the second shaft 102 may be selectively coupled with the sun gear 106.

The planetary gear set 107 again contains three main components that correspond to three inputs/outputs. In the center of the planetary gear set 107 is the sun gear 106. The teeth of the sun gear 106 are meshed with the teeth of the plurality of planet gears 105. The plurality of planet gears 105 are rotatably interconnected to the planetary carrier 104. The teeth of the ring gear 108 are meshed with the teeth of the plurality of planet gears 105. One feature of the planetary gear set 107 is that a direct mechanical interconnection can be achieved between any two of the three main components by holding the third component stationery. For example, if the ring gear 108 is held stationary, rotation of the planetary carrier 104 will result in rotation of the sun gear 106. Alternatively, if the planetary carrier 104 is held stationary, rotation of the ring gear 108 will result in rotation of the sun gear 106.

In this scenario, each planet gear 105 of the plurality of planet gears 105 will rotate about a separate stationary axis transferring the rotary motion of the ring gear 108 to the sun gear 106. Finally, if the sun gear 106 is held stationary, rotation of the planetary carrier 104 will result in rotation of the ring gear 108.

If any one of the three main components of the planetary gear set 107 is allowed to rotate freely, no rotational power may be transferred between the other two components. For example, if no load is present on the ring gear 108 and a load is present on the sun gear 106, rotational power delivered to the planetary carrier 104 will result in rotation of the planetary carrier 104 about a stationary sun gear 106 and the ring gear 108 will rotate freely (i.e., the ring gear 108 will freewheel).

The number of planet gears 105 mounted to the planetary carrier 104 may be varied. The first shaft 101 may be interconnected to a rotational power source such as an automotive engine through a splined region at the end of the first shaft 101 or by any other means known to those skilled in the art. Also, those skilled in the art of transmission and gear design will readily recognize that, in general, the number of teeth, size, and gear ratios of any gear or group of gears described herein may be altered to achieve particular results.

The second shaft 102 may serve as an output shaft. The second shaft 102 is shown in FIG. 1 being rigidly attached to the sun gear 106. The second shaft 102 may be interconnected to various components of a vehicular drive train (e.g. transmission, additional gear sets, differential, etc.) to transmit rotational power to move the vehicle.

The third component of the planetary gear set 107, the ring gear 108, is shown in FIG. 1 coupled to the hydrostatic pump 110. The hydrostatic pump 110 illustrated in FIG. 1 is an axial piston pump. Other hydraulic pump designs known to those skilled in the art, such as radial piston pumps may be utilized in place of, or in addition to, the illustrated axial piston pump. Preferably, the type of hydraulic pump used includes reciprocating pistons such as those in axial piston pumps and radial piston pumps. In FIG. 1, the ring gear 108 is rigidly interconnected to the third rotational interface in the form of a hollow shaft 111, which is free to rotate independently from the first shaft 101 and which is concentrically disposed relative to and disposed about the first shaft 101 in the illustrated embodiment. In turn, the hollow shaft 111 is rigidly interconnected to a cylinder block 112 of the hydrostatic pump 110 such that the cylinder block 112 rotates along with the hollow shaft 111. Therefore, the ring gear 108 is coupled to the cylinder block 112 through the hollow shaft 111. The cylinder block 112 is operable to rotate about the rotational axis of the hollow shaft 111 within a housing 113 of the hydrostatic pump 110. The housing 113 may be maintained in a stationary position (e.g., by being mounted in the vehicle so that it does not rotate). The housing 113 may have a first end 116 and a second end 118. Within the housing 113 is an angled swash plate 114, which, in the embodiment of FIG. 1, is at a fixed angle and is fixed to the housing 113. Within the cylinder block 112 are a plurality of axial bores 115, such as axial bores 115a and 115b. Within the plurality of axial bores 115, are a plurality of slidably disposed pistons 117, such as pistons 117a and 117b. Each of the plurality of pistons 117 has a shoe 119 for slidably interfacing against the swash plate 114.

As the plurality of pistons 117 rotate along with the cylinder block 112, they interface with the swash plate 114, hydraulic fluid passage 120 and hydraulic fluid passage 121 embedded in the housing 113. Hydraulic fluid passage 120 may be a single passage or a network of interconnected passages in fluid communication with a first port 122. Hydraulic fluid passage 121 may be a single passage or a network of interconnected passages in fluid communication with a second port 123. The swash plate 114 is held stationary relative to and along with the housing 113. Therefore, as the pistons 117 ride along the swash plate 114 during rotation of the cylinder block 112, they experience a compressive force for one half of each rotation of the cylinder block 112 (by axial movement within the corresponding axial bore 115). This compressive force corresponds to the rotation of each individual piston 117 as it rotates to axially move the piston 117 relative to its axial bore 115 from an extended position as shown by piston 117b to a compressed position as shown by piston 117a. Accordingly, rotation of the cylinder block 112 causes the pistons 117 to axially reciprocate within their respective axial bores 115 via engagement with the swash plate 114.

The hydraulic fluid passage 120 is arranged so that all axial bores 115, such as axial bore 115a, that contain pistons 117, such as piston 117a, that are undergoing the compression stroke (due to their interaction with the swash plate 114 as the cylinder block 112 rotates within the housing 113, and where a compression stroke for a piston 117 would be from an axial position (the position of a piston 117 relative to its axial bore 115 being its "axial position") corresponding with the axial position of piston 117b to an axial position corresponding with the axial position of the piston 117a) are in fluid communication with a first port 122. The housing 113 also contains hydraulic fluid passage 121, which is arranged so that all axial bores 115, such as axial bore 115b, that contain pistons 117, such as piston 117b, that are undergoing an expansion stroke (as the cylinder block 112 rotates within the housing 113, and where an expansion stroke for a piston 117 would be from an axial position corresponding with the axial position of piston 117a to an axial position corresponding to the axial position of piston 117b) are in fluid communication with a second port 123. In this regard, as the cylinder block 112 rotates within the housing 113, all axial bores 115 will rotate into and out of fluid communication with hydraulic fluid passages 120 and 121. Accordingly, as pistons 117, such as piston 117a, undergo a compression stroke, the hydraulic fluid may be forced through hydraulic fluid passage 120 and the first port 122 may be the high-pressure output port of the hydrostatic pump 110. Similarly, as pistons 117, such as piston 117b, undergo an expansion stroke, the hydraulic fluid may be drawn into (or forced into under pressure) hydraulic fluid passage 121 and the second port 123 may be the relatively low-pressure input port of the hydrostatic pump 110.

To ensure that each of the plurality of pistons 117 undergoing an expansion stroke remains in continuous contact with the swash plate 114, the hydraulic fluid circuit 103 may provide hydraulic fluid to the second port 123 under a predetermined pressure. This pressure may be supplied by, for example, a charge pump. In one embodiment, an axial piston pump such as that illustrated in FIG. 1 was operated to produce a hydraulic pressure of 2,000 psi. The exemplary system included a charge pump operable to deliver a constant minimum of 325 psi to both the first port 122 and the second port 123. The charge pump pressure ensured that the piston shoes 119 remained in contact with the swash plate 114 and thus prevented damage to the hydrostatic pump 110. The charge pump may be a pump separate from the hydrostatic pump 110 or it may be integrated into the hydrostatic pump 110.

As described in the above examples, a planetary gear system is typically operated in one of two modes, i.e., a freewheeling mode where the input is effectively disconnected from the output by letting the third component of the planetary gear system freewheel, and a locked mode where the third component of the planetary gear system is held stationary allowing the other two components to be interconnected at a fixed ratio. However, by selectively applying variable resistance to the third component, the ratio between the rotation of the other two components (e.g., input and output) can be continuously varied between the freewheeling mode and the locked mode.

A valve 124 interconnected to the first port 122 of the hydrostatic pump 110 through a hydraulic line 125 may be operable to restrict the flow of hydraulic fluid from the first port 122. The resistance of the hydrostatic pump 110 to rotational forces placed on the ring gear 108 to which it is coupled can be continuously varied by regulating the output of the hydrostatic pump 110 through the valve 124. For example, if the valve 124 is used to restrict the output of the hydrostatic pump 110, this flow restriction may result in greater resistance to compression of the pistons 117, as they rotate from an extended position, such as piston 117b, to a compressed position, such as piston 117a. This resistance will translate into a resistance to rotation of the ring gear 108, which is coupled to the hydrostatic pump 110. In turn, this resistance to the ring gear 108 may cause power to be transmitted from the first shaft 101 attached to the planetary carrier 104 to the second shaft 102 attached to the sun gear 106. In this manner, by regulating the flow through the valve 124, the ratio of the rotational rate of the first shaft 101 with respect to the rotational rate of the second shaft 102 may be continuously varied. If the valve 124 used to restrict the output of the hydrostatic pump 110 is fully closed, substantially no fluid may be capable of flowing out of the hydrostatic pump 110. Since the hydraulic fluid used may be substantially incompressible, the pistons 117, such as piston 117a, undergoing a compression stroke may be unable to move and the resultant force placed on to the swash plate 114 may thereby prevent the cylinder block 112 from rotating relative to the swash plate 114 and housing 113. Under these circumstances, nearly 100% of the rotational power delivered to the first shaft 101 may be transmitted to the second shaft 102. Thus, the planetary gear set 107 may also function as a power dividing device in that, for example, if a load is applied to the ring gear 108, a rotational input applied to the planetary carrier 104 may be split between the sun gear 106 and the ring gear 108. It is this functionality of the planetary gear set 107 that enables the rotational power distribution and control device 100 to operate.

The hydraulic fluid may be any appropriate fluid known to those skilled in the art. In one embodiment, the hydraulic fluid used in any of the systems represented herein may be a grade of diesel oil suitable for such applications.

The housing 113 of the hydrostatic pump 110 may contain a hydraulic fluid drain 126 connected to the hydraulic fluid circuit 103 via a leaked fluid return path 127. The drain 126 may be operable to collect any hydraulic fluid that has leaked out of the cylinder block 112 either, for example, by leaking past the pistons 117, or by leaking from the interface between the cylinder block 112 and the housing 113. In this respect, the hydraulic fluid circuit 103 and hydrostatic pump 110 may form a closed system where no external source of hydraulic fluid is required and no hydraulic fluid leaks from the system. Additionally, aside from a leaked fluid return path 127, the hydraulic fluid circuit 103 and hydrostatic pump 110 may form a hydraulic system that is completely filled with hydraulic fluid and therefore does not contain any substantial gas pockets.

The housing 113 of the hydrostatic pump 110 as illustrated in FIG. 1 may be fixedly mounted in a vehicle. Bearings and/or bushings may be present between rotational elements such as the first shaft 101 and the hollow shaft 111 and the housing 113. The hydraulic fluid circuit 103 may be remotely located relative to the hydrostatic pump 110. Alternatively, the hydraulic fluid circuit 103, and/or other hydraulic components such as the valve 124 may be mounted onto or within the housing 113. The planetary gear set 107 may be mounted external to the hydrostatic pump 110 as illustrated in FIG. 1. In another embodiment, the housing 113 of the hydrostatic pump 110 may also house the planetary gear set 107. In such an embodiment, the rotational power distribution and control device 100 may be configured to have as its external inputs/outputs: an input shaft (e.g. the first shaft 101); an output shaft (e.g. second shaft 102); and at least two fluid ports (e.g. first port 122 and second port 123). In an embodiment where the hydraulic fluid circuit 103 is integrated into the housing 113, the rotational power distribution and control device 100 may be configured to have as its external inputs/outputs: an input shaft; an output shaft; and an input (e.g. an electrical connection) for receiving a control signal.

It is important to note that although the first shaft 101 is described as an input shaft throughout this description, in different applications, the first shaft 101 may serve as an output shaft, an input shaft, and/or a combination of input and output shaft. Similarly, the second shaft 102, although described primarily herein as an output shaft attached, for instance, to a drive wheel, as with the first shaft 101, may serve as an output shaft, an input shaft, or a combination of input and output shaft. Also, the third rotational interface, shown in FIG. 1 as the hollow shaft 111, although described primarily herein as an input/output shaft attached to the hydrostatic pump 110, as with the first shaft 101, may serve as an output shaft, an input shaft, or a combination of input and output shaft. Moreover, the hydrostatic pump 110 and the planetary gear set 107 may be coupled in any appropriate manner. In this regard, any way of transmitting power from one component of the planetary gear set 107 to the hydrostatic pump 110 may be used.

Additionally, the coupling of the cylinder block 112 to the ring gear 108 may be as illustrated in FIG. 1 or may be accomplished by coupling a gear to external teeth on the ring gear 108, or in any other appropriate manner. Other methods of interfacing with a planetary gear set known to those skilled in the art may also be used. Similarly, for various applications, different power sources, loads, power storage devices, or power dissipation devices may be a part of or be attached to the hydraulic fluid circuit 103.

Although the swash plate 114 in FIG. 1 is shown at a fixed angle, a variable angle swash plate may be used. Such a swash plate mechanism may include a swash plate inclinable on a pivot by an actuator. Such arrangements are well known to those skilled in the art. Also, for example, if it is desired to reduce the rotating mass of the system, a configuration where the cylinder block 112 is held stationary and the swash plate 114 is rotated may be used. Such systems typically include a distributor plate keyed to, and rotating with, the swash plate 114 to ensure the proper hydraulic connections between the inlet and outlet ports.

Figure 2:
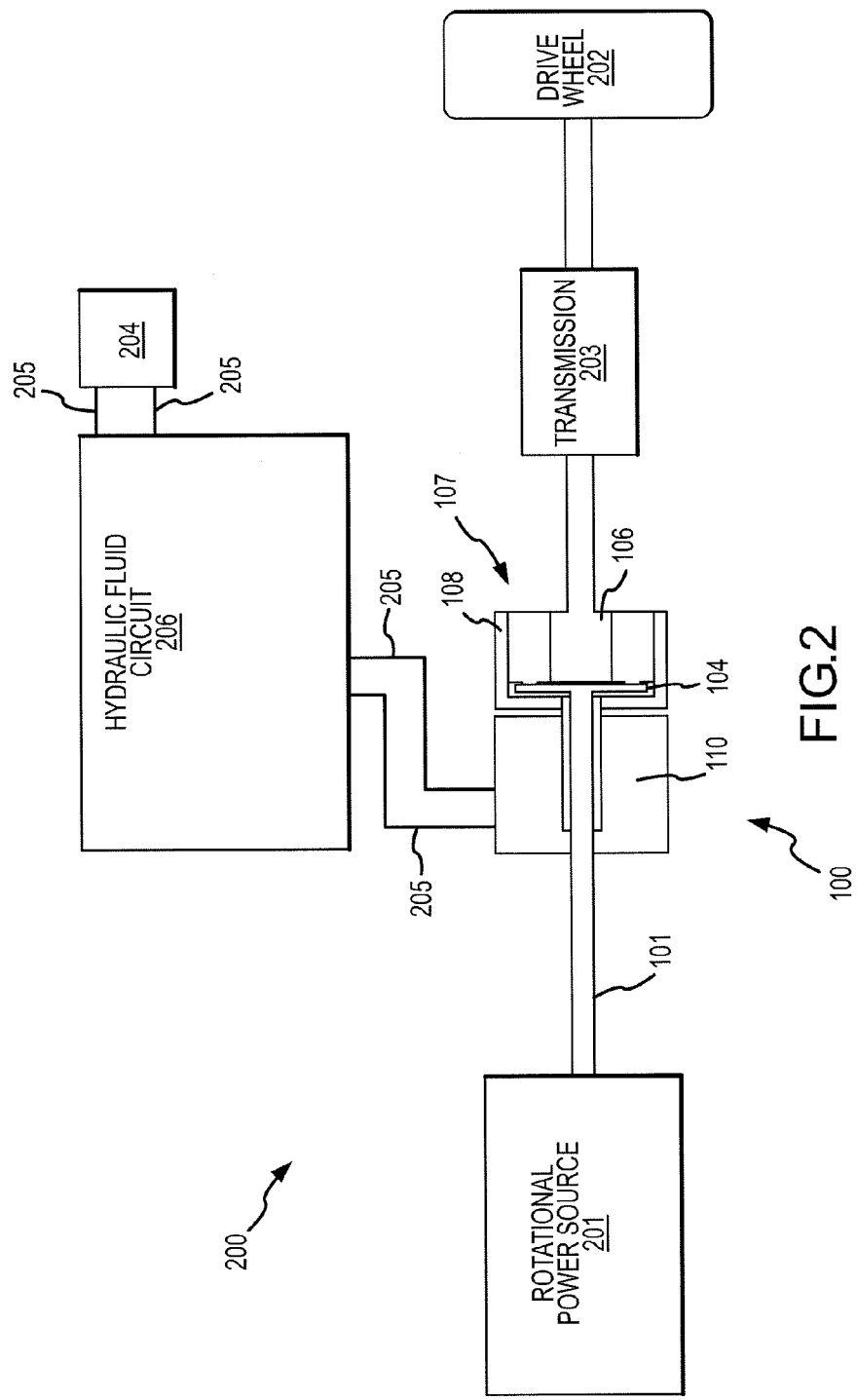
FIG. 2 is a schematic diagram of an exemplary application in a vehicle of the rotational power distribution and control system of FIG. 1.

The rotational power distribution and control device 100 of FIG. 1 will now be described operationally with reference to the schematic of FIG. 2. FIG. 2 schematically illustrates a vehicle drive train 200, which includes a rotational power source 201 of any appropriate size, shape, configuration and/or type (e.g. an internal combustion engine, a diesel-electric power source, or an electric motor), a hydraulic fluid circuit 206, a transmission 203 and a drive wheel 202. Although a single drive wheel 202 is illustrated, the vehicle drive train 200 may have any number of drive wheels. Additionally, other drive train components, for example multiple driven wheels, axles, differentials, continuous velocity (CV) joints, drive shafts, universal joints, transfer cases, viscous couplings, hubs, or any combination thereof, may also be present and are intended to be represented schematically by the drive wheel 202. For example, in a four-wheel drive vehicle, the four driven wheels may be interconnected to the transmission 203 through a transfer case and a pair of differentials. In the illustrated configuration of FIG. 2, the rotational power distribution and control device 100 is located between the rotational power source 201 and the transmission 203. The vehicle drive train 200 may be within any vehicle that uses the rotational power source 201, including but not limited to automobiles, light trucks, heavy-duty trucks, buses, sport utility vehicles, all-terrain vehicles, motorcycles, lawn tractors, farm equipment, and construction equipment.

The initial state of the vehicle drive train 200 may be that the rotational power source 201 is not providing rotational power, the valve 124 on the high pressure output side of the hydrostatic pump 110 is fully open, and the drive wheel 202 and hence the vehicle are locked in place by the brakes of the vehicle drive train 200. The first operational step may be to start the rotational power source 201. In the case where the rotational power source 201 is an internal combustion engine, this may be accomplished with a traditional electric starter attached to the internal combustion engine. Since the valve 124 on the high-pressure output side of the hydrostatic pump 110 is fully open at this time, the ring gear 108 of the planetary gear set 107 will be relatively free to rotate. Conversely, since the drive wheel 202 is locked in position by the brakes of the vehicle drive train 200, the sun gear 106 of the planetary gear set 107 will not be free to rotate. Therefore, when the rotational power source 201 delivers rotational power, the planetary carrier 104 to which the rotational power source 201 is attached (e.g., rotatably coupled) will rotate about the stationary sun gear 106 while the ring gear 108 freewheels. The planetary carrier 104 in FIG. 2 is shown interconnected to the rotational power source 201 by the first shaft 101. At this point, a charge pump 204 may be supplying a predeterminable pressure to the inlet/outlet ports 122 and 123 of the hydrostatic pump 110. The charge pump 204, although shown as a component separate from the hydrostatic pump 110, may be integrated into the hydrostatic pump 110.

Once an operator decides to initiate movement of the vehicle, the transmission 203 may be placed into a low gear, the brakes of the vehicle drive train 200 may be released, and the valve 124 may be incrementally closed or throttled in any appropriate manner to restrict flow from the first port 122 of the hydrostatic pump 110. The restriction of flow from the hydrostatic pump 110 through the first port 122 may result in a resistive torque being applied to the ring gear 108, which may result in a torque being applied to the sun gear 106. Once the resistive torque applied to the ring gear 108 meets or exceeds the resistive torque of the drive wheel 202, the vehicle may begin to move. As the valve 124 is further closed, more torque may flow to the drive wheel 202 and the vehicle may continue to accelerate. Finally, when the valve 124 is completely closed, as discussed previously, substantially all of the torque generated by the rotational power source 201 may flow from the rotational power source 201, through the planetary carrier 104, through the sun gear 106, to the remainder of the drive train, and ultimately to the drive wheel 202. In this regard, it can readily be seen how the rotational power distribution and control device 100 of FIG. 2 performs many of the same functions as a traditional friction disk clutch.

The hydraulic fluid circuit 206 may dissipate the pressure that is generated by any method known to those skilled in the art. The hydraulic fluid circuit 206 may be interconnected with the hydraulic pump 110 via hydraulic lines 205. Since heat will be generated in the system when used in the above described manner, the hydraulic fluid circuit 206 may include a fluid cooling device such as a radiator or other heat exchanger.

As known to those skilled in the art, axial piston pumps such as described above and illustrated in FIG. 1 may also function as hydrostatic motors. For example, if high-pressure hydraulic fluid is delivered to the second port 123 of the rotational power distribution and control device 100, the high-pressure hydraulic fluid will impart an axial force on the pistons 117, which will in turn impart a force on the swash plate 114. This force may in turn cause the cylinder block 112 to rotate relative to the swash plate 114. Once one of the plurality of pistons 117, such as piston 117*b*, is at or near its maximum expansion, it will rotate to a point where it is no longer in fluid communication with the high-pressure hydraulic fluid passage 121 and it will become in communication with hydraulic fluid passage 120, which in this example is a low-pressure outlet from the hydrostatic motor 110.

If an energy storage apparatus, such as an accumulator known to those skilled in the art, is used in the rotational power distribution and control system of FIG. 2, additional system features may be present. For example, the hydrostatic pump 110 may be used as a starter motor when the rotational power source 201 is an internal combustion engine. Accordingly, if the drive wheel 202 is held stationary, for example by the brakes of the vehicle drive train 200, and high-pressure hydraulic fluid is delivered to the hydrostatic pump 110, the hydrostatic pump 110 may act as a hydrostatic motor 110. The hydrostatic motor 110 may turn the ring gear 108 of the planetary gear set 107, which in turn may cause the planetary carrier 104 to rotate thus rotating the crankshaft of the internal combustion engine. Similarly, when the rotational power source 201 is not running, the planetary carrier 104 may be held stationary. Under such circumstances, high-pressure hydraulic fluid delivered to the hydrostatic motor 110 may cause a torque to be applied to the sun gear 106 of the planetary gears set 107, and hence to the drive wheel 202. Depending on which port the high-pressure hydraulic fluid is delivered to, either forward or rearward motion of the vehicle may be achieved.

The transmission 203 illustrated in FIG. 2 may be either a manual transmission or an automatic transmission. Where the transmission 203 is a manual transmission, the rotational power distribution and control device 100 may replace the manual clutch. In such a configuration, the valve 124 may be interconnected to the traditional clutch pedal of the vehicle. Alternatively, the valve 124 may be controlled by some other manual or automatic control apparatus. Where the transmission 203 is an automatic transmission, the rotational power distribution and control device 100 may replace the torque converter. In such a configuration, the valve 124 may be controlled manually or automatically. Accordingly, the transmission 203 illustrated herein may or may not include a clutch or torque converter. For example, there may be no need for a clutch or torque converter in the vehicle drive train 200 of FIG. 2 since the rotational power distribution and control device 100 may, as part of its functionality, perform the same function as a clutch or torque converter.

The compact nature of the rotational power distribution and control device 100 illustrated in FIG. 1 enables the rotational power distribution and control device 100 to be installed in the place of an existing manual clutch or torque converter with a minimal amount of vehicle modification. The ability of a vehicle to be retrofitted with a rotational power distribution and control device 100 as illustrated herein, is a significant feature. In particular, the ability of the rotational power distribution and control device 100 to be retrofitted into an existing vehicle enables the continuously variable transmission and hybrid drive system embodiments discussed below to be retrofitted into existing vehicles. This permits vehicle operators to gain the benefits and efficiency of such systems without the significant upfront costs of purchasing entirely new vehicles.

Figure 8A:
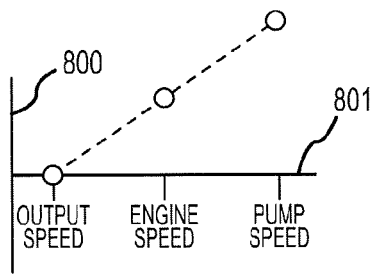
FIGS. 8A through 8G are graphical representations of different modes of operation of the hybrid drive systems of FIGS. 5 and 6.
Figure 8B:
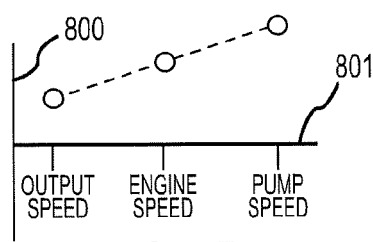
Figure 8E:
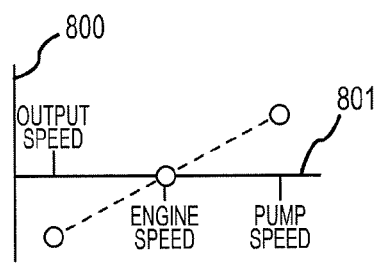
Figure 8C:
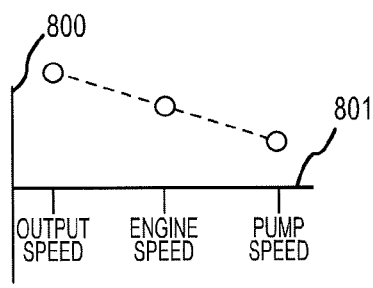
Figure 8F:
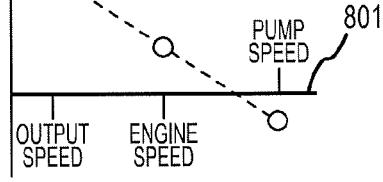
Figure 8D:
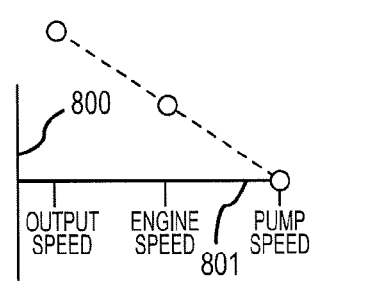

The operation of the rotational power distribution and control device 100 will now be described with reference to FIGS. 8A through 8D. The relationship between the three components of the planetary gear set 107 is a linear relationship which is illustrated in FIGS. 8A through 8D. In each of FIGS. 8A-8G, a vertical axis 800 represents the rotational speed of the indicated component along a horizontal axis 801. Positions above the horizontal axis indicate positive values and positions below the horizontal axis indicate negative values. Also, in each of the FIGS. 8A-8G, output speed is the speed of the sun gear 106 interconnected to the drive wheel 202; engine speed is the speed of the planetary carrier 104 interconnected to the rotational power source 201; and pump speed is the speed of the ring gear 108 interconnected to the hydrostatic pump 110. For illustration purposes, the graphs depict the relationship between the speeds of the various components. FIG. 8A represents the situation where output speed is zero and the vehicle is not moving, the rotational power source 201 is running, and the hydrostatic pump 110 (attached to the ring gear 108) is freewheeling. As a resistance is placed on the ring gear 108 by the hydrostatic pump 110, pump speed slows down. As shown in FIG. 8B, at a constant rotational power source 201 speed, slowing down the hydrostatic pump 110 results in an increase in the output speed. As further resistance is placed on the ring gear 108 by the hydrostatic pump 110, output speed is further increased. This is illustrated in FIG. 8C. When maximum resistance is applied by the hydrostatic pump 110 and the ring gear 108 is stopped, output speed is maximized for a given rotational power source 201 speed. This is illustrated in FIG. 8D.

Figure 3:
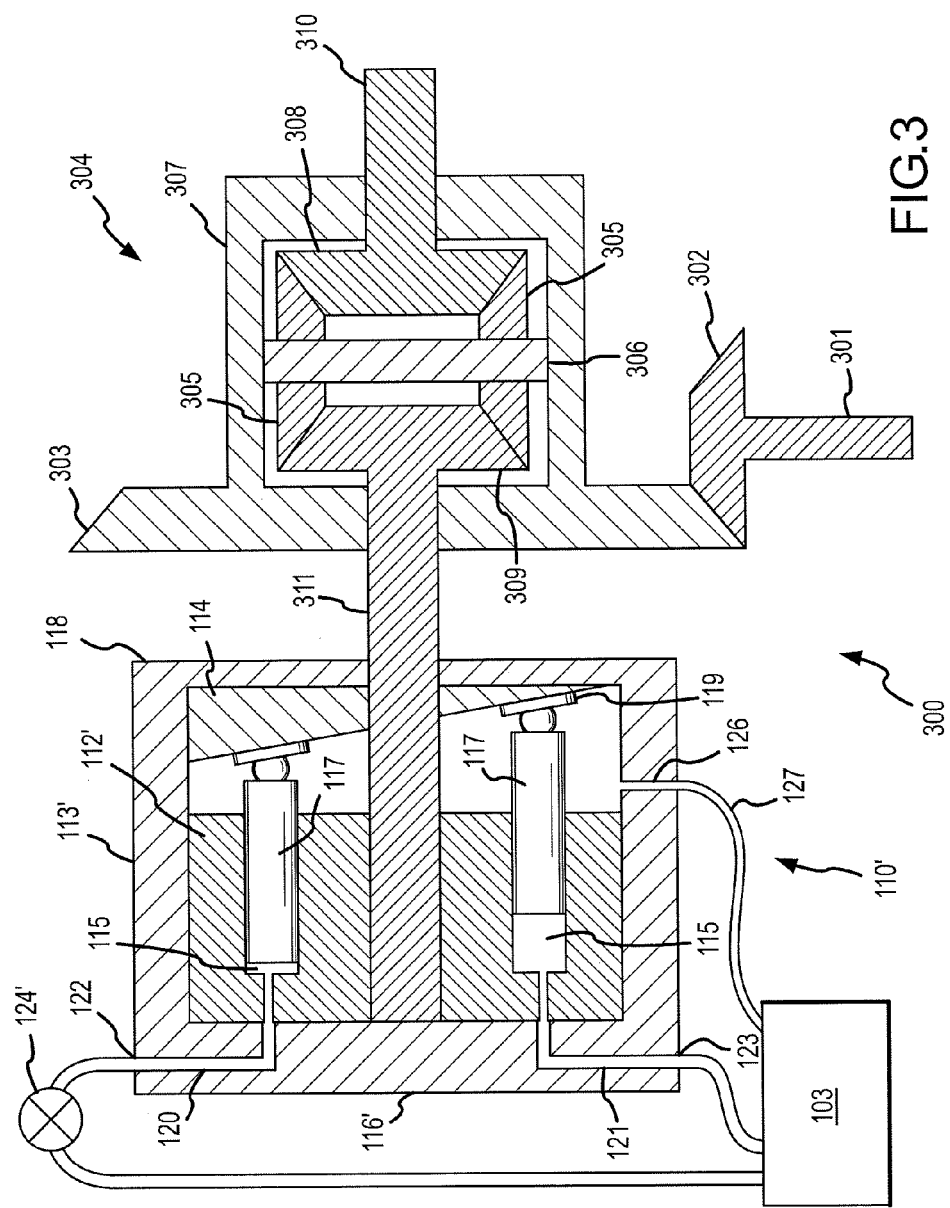
FIG. 3 is a cross-sectional schematic view of one alternative embodiment of a rotational power distribution and control system configured as a hydraulic clutch.

FIG. 3 is a cross-sectional schematic view of another embodiment of a rotational power distribution and control device 300. As with the embodiment of FIG. 1, for purposes of illustration, the functionality of this embodiment will be described in the context of a vehicular application. Many of the components of the rotational power distribution and control device 300 of FIG. 3 are the same or similar to corresponding components of the rotational power distribution and control device 100 of FIG. 1. The primary difference between the rotational power distribution and control device 100 of FIG. 1 and the rotational power distribution and control device 300 of FIG. 3 is that the rotational power distribution and control device 100 of FIG. 1 uses the planetary gear set 107 as the power dividing gear set, whereas the rotational power distribution and control device 300 of FIG. 3 uses a differential gear set 304 as the power dividing gear set. To avoid repetition, only the components of the rotational power distribution and control device 300 of FIG. 3 that are significantly different than the corresponding components of the rotational power distribution and control device 100 of FIG. 1 will be described in detail. The rotational power distribution and control device 300 may be used in place of the rotational power distribution and control device 100 in each of the configurations illustrated herein.

In the rotational power distribution and control device 300 of FIG. 3, a pinion gear shaft 301 may serve as a first rotational input shaft. The pinion gear shaft 301 may, for example, may be interconnected to the rotational output of a rotational power source 201 in a vehicle. The pinion gear shaft 301 is coupled to a pinion gear 302, which is coupled to a ring gear 303. The ring gear 303 is coupled to a carrier 307 of the differential gear set 304. The illustrated differential gear set 304 is similar to a typical automotive differential well known to those skilled in the art. As in a typical automotive differential, the differential gear set 304 includes a pair of spider gears 305 rotatably interconnected to a spider gear shaft 306, which is interconnected to the carrier 307. The spider gears 305 are meshed with a first side gear 308 and a second side gear 309. The first side gear 308 is coupled to a first side shaft 310. The second side gear 309 is coupled to a second side shaft 311. In the configuration illustrated in FIG. 3, the first side shaft 310 is the rotational output of the rotational power distribution and control device 300 and the second side shaft 311 is coupled to a hydrostatic pump 110'. The hydrostatic pump 110' functions similarly to the hydrostatic pump 110 of FIG. 1. As opposed to the hydrostatic pump 110 of FIG. 1, the hydrostatic pump 110' of FIG. 3 may not need to accommodate a through-shaft such as first shaft 101. Therefore, as shown in FIG. 3, a cylinder block 112' may be rigidly interconnected to the second side shaft 311. Accordingly, a first end 116' of a housing 113' may be closed as illustrated in FIG. 3.

One feature of the differential gear set 304 that is similar to the planetary gear set 107, is that a direct mechanical interconnection can be achieved between any two of the three main components (carrier 307 rigidly attached to the ring gear 303, first side gear 308, and second side gear 309) by holding the third component stationery. For example, if the second side gear 309 is held stationary, rotation of the ring gear 303 will result in rotation of the first side gear 308. Alternatively, if the ring gear 303 is held stationary, rotation of the second side gear 309 will result in rotation of the first side gear 308. Finally, if the first side gear 308 is held stationary, rotation of the ring gear 303 will result in rotation of the second side gear 309.

If any one of the three main components of the differential gear set 304 is allowed to rotate freely, no rotational power may be transferred between the other two components. For example, if no load is present on the second side gear 309 and a load is present on the first side gear 308, rotational power delivered to the ring gear 303 will result in the second side gear 309 freewheeling.

As in the planetary gear set 107, by selectively applying variable resistance to one of the three main components of the differential gear set 304, the ratio between the rotation of the other two components (e.g., input and output) can be continuously varied between the freewheeling mode and the locked mode.

As in the rotational power distribution and control device 100 of FIG. 1, the resistance of the hydrostatic pump 110' to rotational forces placed on the second side shaft 311 to which it is coupled can be continuously varied by regulating the output of the hydrostatic pump 110' through a valve 124' in the case of the rotational power distribution and control device 300. In turn, this resistance to the second side shaft 311 may cause power to be transmitted from the ring gear 303 attached to the carrier 307 to the first side shaft 310. In this manner, by regulating the flow through the valve 124', the ratio of the rotation of the ring gear 303 with respect to the first side shaft 310 may be continuously varied. Thus, the differential gear set 304 may function as a power dividing device. Those skilled in the art of differential and gear design will readily recognize that in general the number of teeth, size, and gear ratios of any gear or group of gears described herein may be altered to achieve particular results.

The hydrostatic pump 110' illustrated in FIG. 3 is an axial piston pump. Other hydraulic pump designs known to those skilled in the art, such as radial piston pumps may utilized in place of or in addition to the illustrated axial piston pump. The functionality, features, and alternative configurations discussed with reference to the hydrostatic pump 110 of FIG. 1 are also applicable to the hydrostatic pump 110' of FIG. 3.

Figure 4A:
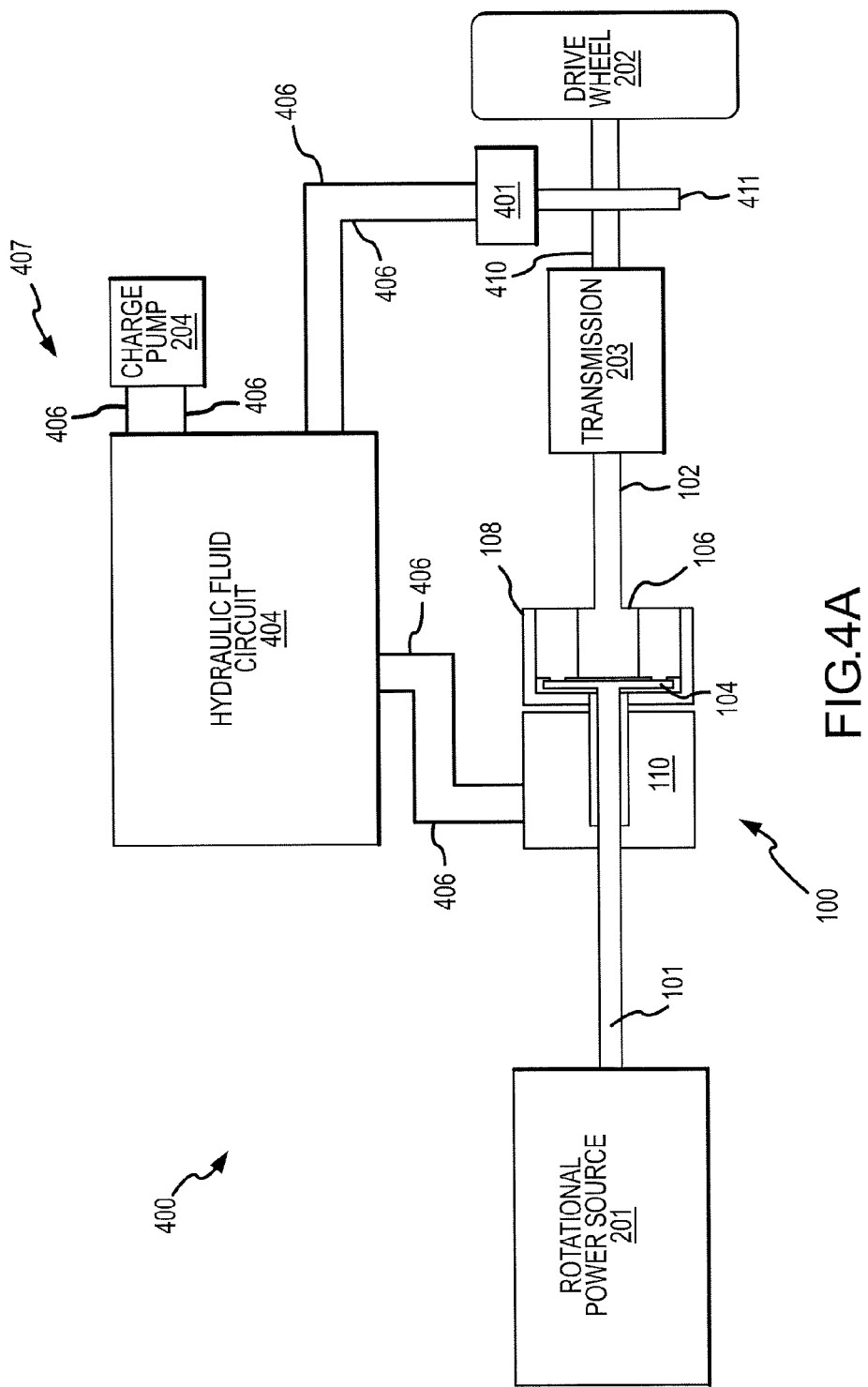
FIGS. 4A and 4B are schematic diagrams of embodiments of a rotational power distribution and control system configured as continuously variable transmission drive systems in a vehicle drive train.

FIG. 4A schematically illustrates a vehicle drive train 400 that includes a rotational power distribution and control system operable to function as a CVT 407. In the CVT 407, the pressure created by the hydrostatic pump 110 of the rotational power distribution and control device 100 may be used to increase the overall efficiency of the vehicle in which the rotational power distribution and control device 100 is incorporated. In the CVT 407 of FIG. 4A, the pressure created by the hydrostatic pump 110 as it introduces resistance to the rotation of the ring gear 108 may be used to power an additional hydrostatic motor 401 interconnected to the drive wheel 202. Therefore, the rotational power source 201 individually, or the rotational power source 201 in combination with the hydraulic motor 401, may be used to drive the drive wheel 202.

In this manner, the power produced by the rotational power source 201 may be divided by the rotational power distribution and control device 100 with some of the power directly driving the drive wheel 202 and some of the power driving the hydrostatic pump 110. Power, in the form of output from the hydrostatic pump 110, may be routed through a hydraulic fluid circuit 404 via hydraulic lines 406 to the hydrostatic motor 401, which may in turn also drive the drive wheel 202. In this regard, the rotational power source 201 may be operated at a particular rotational rate where it is most efficient, most powerful or at any other output level while the vehicle is accelerated or decelerated through varying velocities. As with the schematic of the rotational power distribution and control device 100 discussed above with reference to FIG. 2, the rotational power distribution and control device 100 in the CVT 407 of FIG. 4A may be located between the transmission 203 and the rotational power source 201, and may replace the manual clutch of a manual transmission or the torque converter of an automatic transmission. Thus in FIG. 4A, the rotational power source 201 is illustrated as interconnected to the rotational power distribution and control device 100 via the first shaft 101 and the rotational power distribution and control device 100 is interconnected to the transmission 203 via the second shaft 102. In turn, the output 410 of the transmission 203 is interconnected to the drive wheel 202. The hydrostatic motor 401 may be coupled to the output 410 of the transmission 203 via a drive gear 411. This interconnection may, for example, be an arrangement where the hydrostatic motor 401 is coupled such that it overdrives the output 410 of the transmission 203. In another embodiment, the CVT 407 may replace the transmission 203 in the vehicle drive train 400. In such a configuration, the sun gear 106 of the rotational power distribution and control device 100 may be directly interconnected to the drive wheel 202.

Figure 4B:
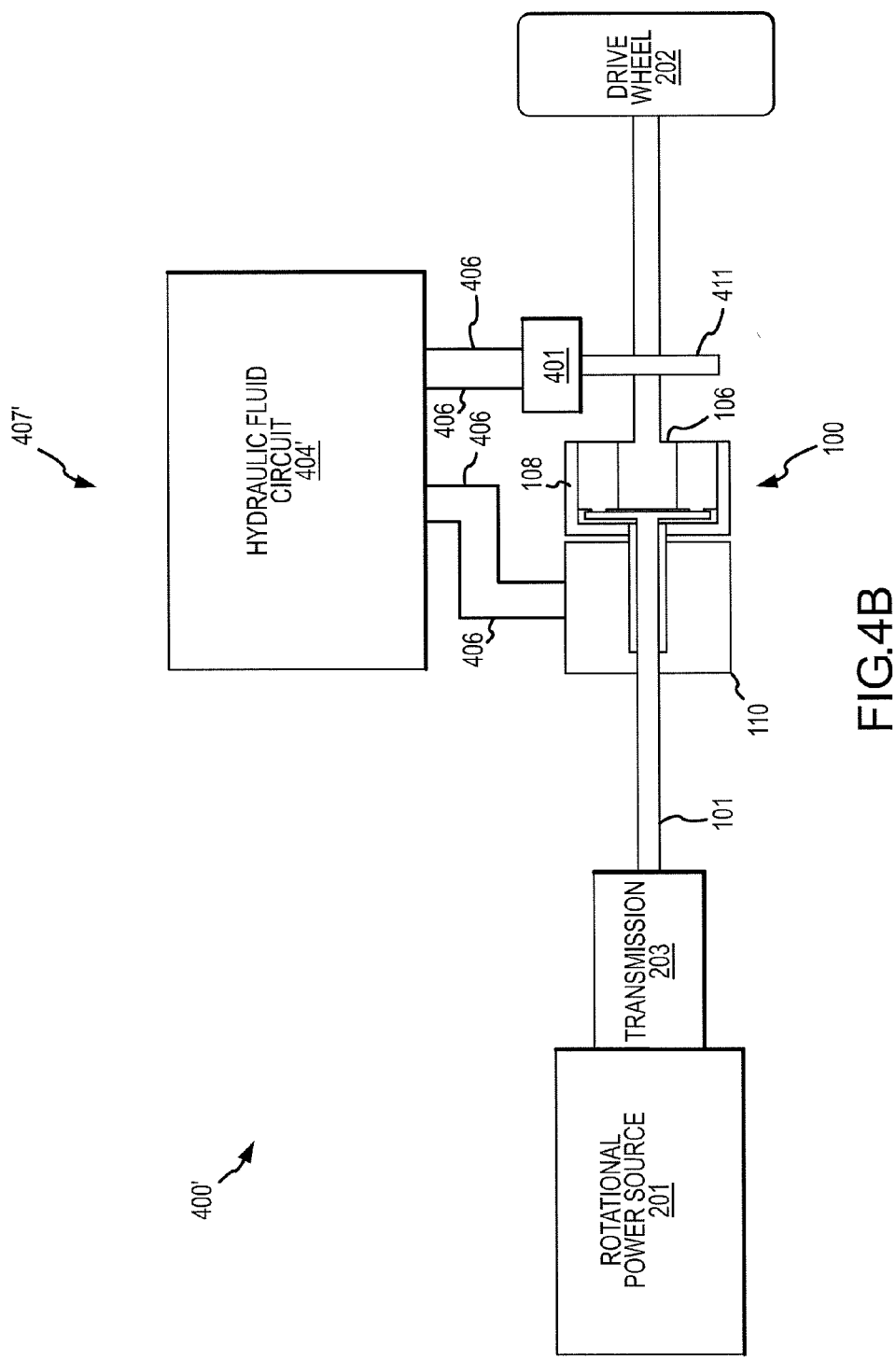

FIG. 4B illustrates another embodiment of a CVT 407' installed in a vehicle drive train 400'. In the configuration of FIG. 4B, the CVT 407' is located between the transmission 203 and the drive wheel 202. Such a configuration is particularly suitable for an application where the CVT 407' is to be installed in an existing vehicle. For example, in a rear wheel drive vehicle, the CVT 407' may be installed between the transmission 203 and rear differential. In this regard, the existing transmission 203 may remain unmodified with the CVT 407' coupled to the rear output of the transmission 203, and a new or modified driveshaft, shorter than the original driveshaft, may be used to interconnect the CVT 407' with the rear differential.

If an energy storage apparatus, such as an accumulator known to those skilled in the art, is used in the CVTs 407 and 407' of FIG. 4A or 4B, respectively, additional system features may be present. For example, the hydrostatic pump 110 may be used as a starter motor similar to as described above. The stored energy may be used to move the vehicle in either a forward or reverse direction for limited periods by delivering the stored energy to the hydrostatic motor 401.

The CVTs 407 and 407', which are operationally similar, will now be described operationally with reference to the schematic of FIG. 4A. The initial state of the system may be that the rotational power source 201 is not running, the hydrostatic pump 110 is applying little or no resistance to the ring gear 108, and the drive wheel 202 and hence the vehicle drive train 400 are locked in place by the brakes of the vehicle drive train 400. In the case where the rotational power source 201 is an internal combustion engine, the first operational step may be to start the internal combustion engine, which turns the planetary carrier 104. However, no power may be transmitted to drive wheel 202 since the ring gear 108 is allowed to freewheel at this time.

Once an operator decides to initiate movement of the vehicle, the transmission 203 may be placed into a low gear, the brakes of the vehicle drive train 400 may then be released, and the hydrostatic pump 110 may begin to apply resistance to the ring gear 108, resulting in a torque being applied to the sun gear 106. At the same time, the output of the hydrostatic pump 110 may be routed through the hydraulic fluid circuit 404 to the hydrostatic motor 401, which results in additional torque being applied to the drive wheel 202 and motion of the vehicle. Also, at the same time the rotational power source 201 may be set to an RPM level where it is able to efficiently produce enough power to accelerate the vehicle at a desired rate.

Initially, the hydrostatic pump 100 may be rotating at a rate far exceeding that of the sun gear 106 and much of the power supplied to the drive wheel 202 may be flowing through the hydraulic fluid circuit 404. As the vehicle accelerates, a greater percentage of the power delivered to the drive wheel 202 may flow from the rotational power source 201 to the planetary carrier 104 and directly to the sun gear 106 (interconnected to the drive wheel 202) and a correspondingly smaller portion of the power produced by the rotational power source 201 may flow through the hydraulic fluid circuit 404. Finally, when the hydrostatic pump 110 is stopped, substantially all of the power generated by the rotational power source 201 may flow from the rotational power source 201 to the planetary carrier 104 and directly to the sun gear 106. At this point, the hydrostatic pump 110 may again be allowed to freewheel (effectively disconnecting the rotational power source 201 from the drive wheel 202) and the transmission 203 may be placed in a higher gear. This may be followed by repeating the process of altering the division of power between the mechanical path and the hydraulic system.

As discussed above, an energy storage apparatus may be present. The energy storage apparatus may be charged in a variety of ways. For example, some of the power delivered through the hydraulic pump 110 may be stored for later use. Also, the vehicle drive train 400 may employ regenerative braking in that the hydrostatic motor 401 may be used to generate energy during deceleration and that energy may be stored. In this situation, the hydrostatic motor 401 may be acting as a hydraulic pump by converting the kinetic energy of the vehicle into hydraulic pressure, which may then be stored in the energy storage apparatus.

In one embodiment, the CVT 407 may be configured by modifying an existing automatic transmission. In such an embodiment, the hydrostatic pump 110 may replace existing bands and clutches within the automatic transmission and be interconnected with an existing planetary gear set within the automatic transmission. The hydrostatic motor 401 may be coupled to an output component such as a ring gear of an overdrive planetary gear set. Planetary gear sets and components of the automatic transmission may be retained to achieve, for example, reverse, low, high and overdrive ranges of operation.

Figure 5:
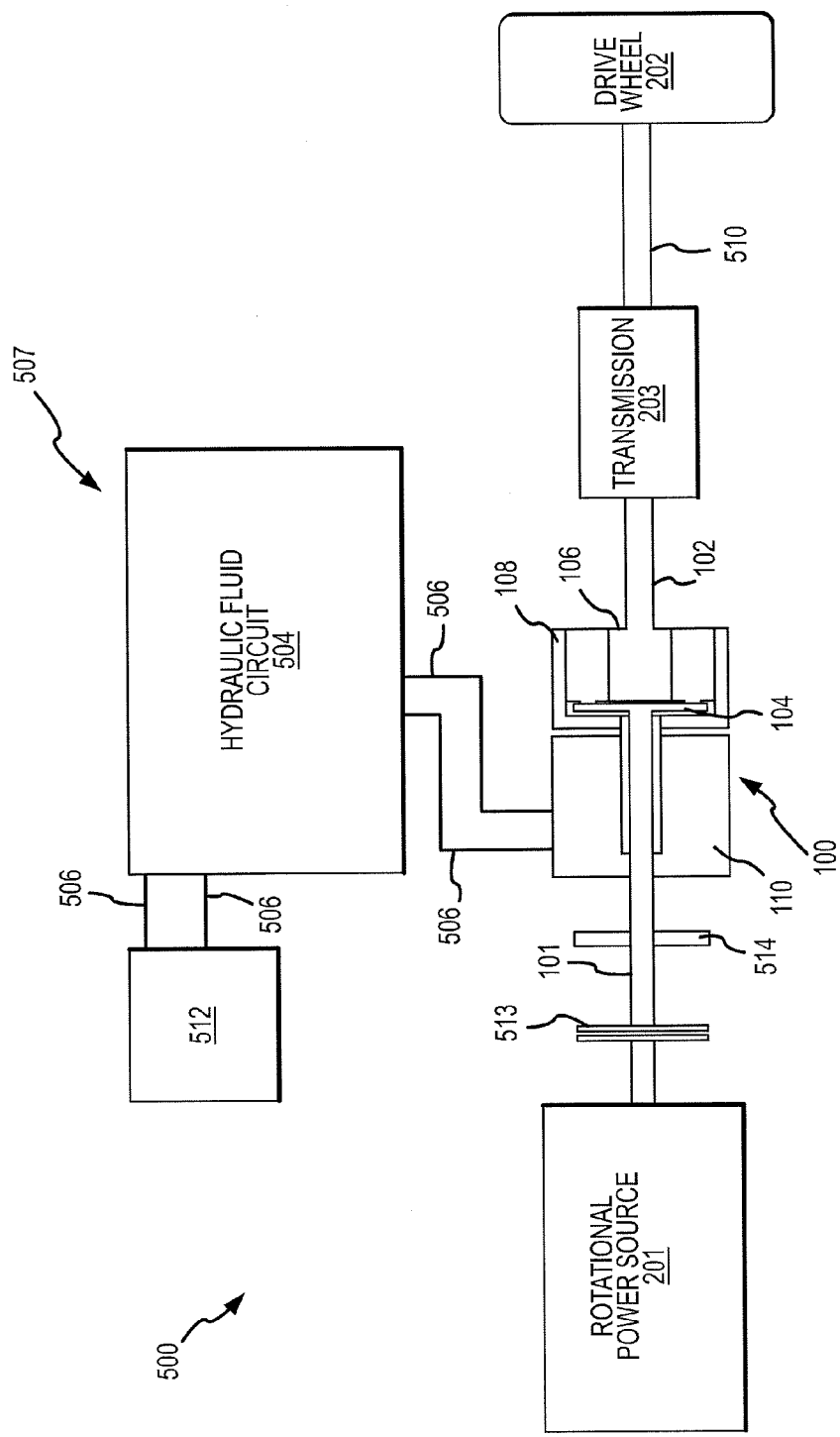
FIG. 5 is a schematic diagram of one embodiment of a rotational power distribution and control system configured as a single pump/motor hybrid drive system in a vehicle drive train.

FIG. 5 schematically illustrates a single pump/motor hybrid drive system 507 installed within a vehicle drive train 500. The power distributed to the hydrostatic pump 110 of the rotational power distribution and control device 100 may be directed to an energy storage apparatus 512, and this energy may be stored and used at appropriate times to increase the overall efficiency of the vehicle drive train 500 in which the single pump/motor hybrid drive system 507 is incorporated. In the single pump/motor hybrid drive system 507 of FIG. 5, the pressure created by the hydrostatic pump 110, as it introduces resistance to the rotation of the ring gear 108, may be stored in an energy storage apparatus 512.

In this manner, the power produced by the rotational power source 201 may be divided by the rotational power distribution and control device 100 with some of the power directly driving the drive wheel 202 and some of the power driving the hydrostatic pump 110. The power, in the form of output from the hydrostatic pump 110, may be routed through a hydraulic fluid circuit 504 via hydraulic lines 506 to the energy storage apparatus 512. In this regard, the rotational power source 201 may be operated at a particular rotational rate where it is most efficient, most powerful or at any other output level. As with the schematic of the CVT 407 discussed above with reference to FIG. 4A, the rotational power distribution and control device 100 in the single pump/motor hybrid drive system 507 of FIG. 5 may be located between the transmission 203 and the rotational power source 201 and may replace the manual clutch of a manual transmission or the torque converter of an automatic transmission. Thus in FIG. 5, the rotational power source 201 is illustrated as interconnected to the rotational power distribution and control device 100 via the first shaft 101 and the rotational power distribution and control device 100 is interconnected to the transmission 203 via the second shaft 102. In turn, the output 510 of the transmission 203 is interconnected to the drive wheel 202. In another embodiment, the single pump/motor hybrid drive system 507 may replace the transmission 203 in a manner similar to as discussed previously with respect to the CVT 407. The single pump/motor hybrid drive system 507 may also be located between the transmission 203 and the drive wheel 202 similar to as discussed above with reference to FIG. 4B. As previously stated, such a configuration is particularly suitable for an application where the single pump/motor hybrid drive system 507 is to be installed in an existing vehicle (e.g., a retrofit application).

The energy storage apparatus as discussed above with reference to the CVTs 407 and 407' of FIGS. 4A and 4B, respectively, has a primary function of storing energy for specific uses such as starting an internal combustion engine and moving the vehicle for a relatively short period in either a forward or reverse direction. In contrast, the energy storage apparatus 512 of the single pump/motor hybrid drive system 507 may be operable to store energy that can later be used to operate the vehicle under normal driving conditions or at any appropriate time. The energy storage apparatus 512 may also be operable to store energy captured during vehicle deceleration, i.e., the energy storage apparatus 512 may enable the vehicle to employ regenerative braking. As in the CVTs 407 and 407', the hydrostatic pump 110 also may be used as a starter motor.

The single pump/motor hybrid drive system 507 of FIG. 5 will now be described operationally. The initial state of the single pump/motor hybrid drive system 507 may be that the rotational power source 201 is not running, the hydrostatic pump 110 is applying no resistance to the ring gear 108, and the drive wheel 202 and hence the vehicle drive train 500 are locked in place by the brakes of the vehicle drive train 500. There may also be energy stored within the energy storage apparatus 512.

The first operational step may be to turn on the single pump/motor hybrid drive system 507. At this point, the operational steps performed by the single pump/motor hybrid drive system 507 may depend on the amount of energy stored within the energy storage apparatus 512. For example, if the energy storage apparatus 512 is storing an amount of energy above a predetermined level, the single pump/motor hybrid drive system 507 may determine that initial vehicle drive train 500 operation may be powered by energy stored within the energy storage apparatus 512. Alternatively, for example, if the energy storage apparatus 512 is storing an amount of energy below a predetermined level, the single pump/motor hybrid drive system 507 may start the rotational power source 201 and, while holding the sun gear 106 stationery (e.g. by engaging the brakes of the vehicle drive train 500), direct the rotational power output of the rotational power source 201 to the hydrostatic pump 110. The output of the hydrostatic pump 110 may then be directed to the energy storage apparatus 512. The aforementioned determinations may be made by a microprocessor (not shown) and software in communication with various components of the vehicle drive train 500 and single pump/motor hybrid drive system 507. Indeed, each of the systems described herein may be in communication with and controlled by microprocessors and control software.

Once an operator decides to initiate movement of the vehicle, the vehicle drive train 500 may again operate in different modes depending on the state of the energy storage apparatus 512. For example, if the energy storage apparatus 512 is storing an amount of energy above a predetermined level, the single pump/motor hybrid drive system 507 may deliver power to the drive wheel 202 from the energy storage apparatus 512. To transfer energy from the energy storage apparatus 512, the hydraulic fluid circuit 504 may direct a flow of hydraulic fluid under pressure from the energy storage apparatus 512 to the hydrostatic pump 110. The hydrostatic pump 110, acting as a motor, may then deliver rotational power to the ring gear 108.

In order to transfer rotational power to the sun gear 106, and eventually to the drive wheel 202, the planetary carrier 104 may be held stationery. Holding the planetary carrier 104 stationery may be accomplished in a variety of ways. For example, the rotational power source 201 may first be disconnected from the first shaft 101. This may be accomplished using a disconnect mechanism 513 of any appropriate type. This disconnect mechanism 513 may be a slidable transmission shaft such as described in U.S. Pat. No. 5,732,595, also by the present inventor. U.S. Pat. No. 5,732,595 is incorporated in its entirety by reference herein. Once the rotational power source 201 is disconnected, a locking mechanism 514 of any appropriate type may be used to prevent the planetary carrier 104 from rotating. The locking mechanism 514 may be similar to a drive shaft mounted brake known to those skilled in the art. Other methods of disconnecting rotational power sources (e.g., clutches, torque converters, etc.) and locking rotating shafts in place known to those skilled in the art may also be used. While disconnected, the rotational power source 201 may be turned off or may be idling.

Figure 8G:
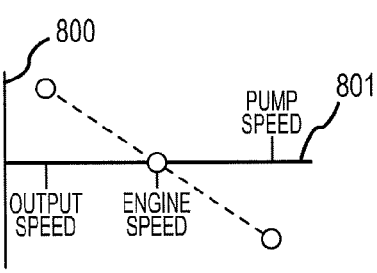

Once the planetary carrier 104 is prevented from rotating, the power delivered by the hydrostatic pump 110 to the ring gear 108 may flow through the sun gear 106 and to the drive wheel 202 causing the vehicle to move. In this manner, energy from the energy storage apparatus 512 can be used to power of the vehicle drive train 500. This is illustrated by the graphs of FIGS. 8E and 8G. FIG. 8E represents the situation where the hydrostatic pump 110 is operating as a motor, wherein a positive rotation of the hydrostatic pump 110 results in the vehicle output speed being negative. FIG. 8G represents the opposite situation wherein a negative rotation of the hydrostatic pump 110 results in the vehicle output speed being positive.

If when the operator initiates vehicle movement, the amount of energy stored in the energy storage apparatus 512 is below a predetermined level, the single pump/motor hybrid drive system 507 may make the determination to operate using power from the rotational power source 201. Under these circumstances, the single pump/motor hybrid drive system 507 may operate similar to the rotational power distribution and control system described with reference to FIG. 2, with the exception that the hydraulic fluid under pressure exiting the hydrostatic pump 110 may be used to store energy within the energy storage apparatus 512.

Generally, when the rotational power source 201 is running, the rotational power distribution and control device 100 may be dividing power between the drive wheel 202 and the energy storage apparatus 512. In this regard, energy may be stored even during acceleration of the vehicle. Only when the hydrostatic pump 110 is completely locked up and prevented from rotating may the rotational power source 201 deliver power to the drive wheel 202 without storing energy.

The single pump/motor hybrid drive system 507 may be operable to switch back and forth during normal operation between powering the vehicle drive train 500 using the rotational power source 201 and powering the vehicle drive train 500 using stored energy in the energy storage apparatus 512. For example, while the rotational power source 201 is powering the vehicle drive train 500, energy may be being stored within the energy storage apparatus 512. Once the level of energy within the energy storage apparatus 512 reaches a predetermined level, the single pump/motor hybrid drive system 507 may switch to the mode where the vehicle drive train 500 is being powered using energy from the energy storage apparatus 512. During this period, the rotational power source 201 may be turned off or allowed to idle. This mode may continue until the level of energy within the energy storage apparatus 512 falls below a predetermined level. At that time, the rotational power source 201 may be reconnected (and restarted if it was turned off) and used to power the vehicle drive train 500 and simultaneously recharge the energy storage apparatus 512.

During normal operation of the vehicle drive train 500, the operator may apply the brakes of the vehicle drive train 500 to decelerate the vehicle. To store the kinetic energy of the vehicle for later use, the single pump/motor hybrid drive system 507 may employ regenerative braking. To accomplish this, once braking has been initiated, the single pump/motor hybrid drive system 507 may disconnect the rotational power source 201 from the planetary carrier 104 and lock the planetary carrier 104 using the locking mechanism 514 to prevent rotation of the planetary carrier 104. In this configuration, the hydrostatic pump 110, acting as a pump driven by the drive wheel 202, may convert the kinetic energy of the vehicle into a hydraulic fluid flow under pressure from the hydrostatic pump 110. This energy may then be stored in the energy storage apparatus 512. Traditional vehicle brakes, such as disk or drum brakes, may also be used in conjunction with or in place of regenerative braking to decelerate the vehicle. As with the aforementioned CVT 407, the single pump/motor hybrid drive system 507 may be configured by modifying an existing automatic transmission.

Moreover, by applying rotational power to the hydrostatic pump 110 while the rotational power source 201 is interconnected to the planetary carrier 104, any ratio of input rotation to output rotation can be achieved, including a negative ratio. This type of configuration is typically referred to by those skilled in the art as an infinitely variable transmission. Of course, it is only infinitely variable in theory only. In actuality, the system is limited by the ability of the components to withstand the forces generated by the rotating and moving components.

The single pump/motor hybrid drive system 507 may be operable to deliver power to the drive wheel 202 from the energy storage apparatus 512 while simultaneously delivering rotating power from the rotational power source 201 to the drive wheel 202. This is best illustrated by returning to the graphs of FIGS. 8A through 8G. FIG. 8D represents the situation where the hydrostatic pump 110 is locked up and therefore the ring gear 108 is not rotating. If at this point, the hydrostatic pump 110 is driven by energy delivered from the energy storage apparatus 512 in a rotational direction opposite of the direction of rotation during normal acceleration (as shown in an FIGS. 8A through 8C), the output speed can be further increased for a given engine speed. This is illustrated in FIG. 8F.

Figure 6:
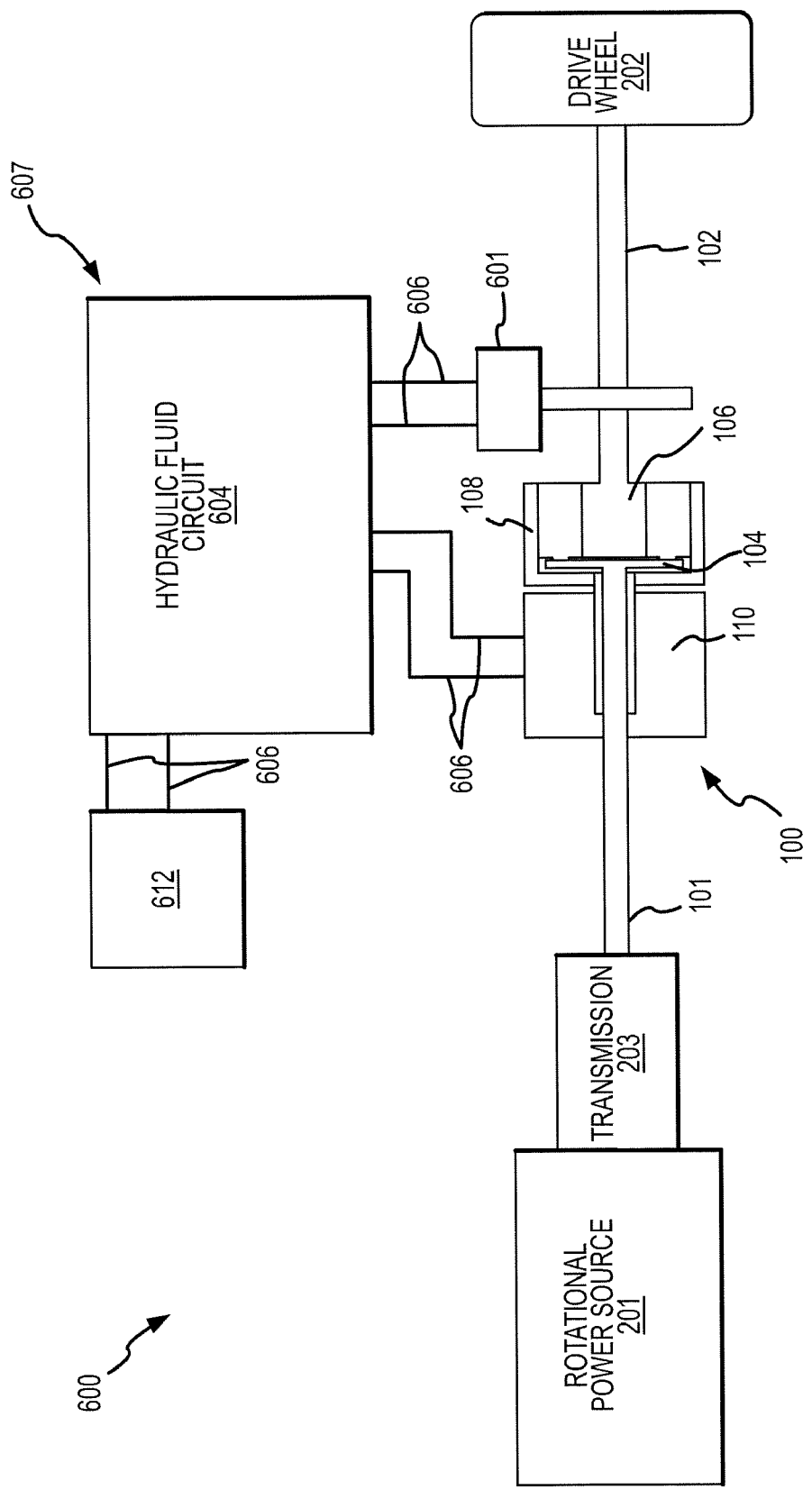
FIG. 6 is a schematic diagram of one embodiment of a rotational power distribution and control system configured as a dual pump/motor hybrid drive system in a vehicle drive train.

Features of the single pump/motor hybrid drive system 507 of FIG. 5 and the CVTs 407 and 407' of FIGS. 4A and 4B, respectively, may be combined to produce a vehicle drive train 600 with a dual pump/motor hybrid drive system 607 schematically illustrated in FIG. 6. The dual pump/motor hybrid drive system 607 is similar to the CVT 407 with the addition of an energy storage apparatus 612, similar to the energy storage apparatus 512 of the single pump/motor hybrid drive system 507. The dual pump/motor hybrid drive system 607 shares many of the features and abilities of the single pump/motor hybrid drive system 507 and CVTs 407 and 407' previously discussed. As illustrated in FIG. 6, the dual pump/motor hybrid drive system 607 includes a rotational power distribution and control device 100 (which includes a hydrostatic pump 110) and a hydrostatic motor 601. The dual pump/motor hybrid drive system 607 may contain more than the two illustrated pump/motors 110 and 601 of FIG. 6. Additional hydrostatic motors similar to or different from the hydrostatic motor 601 may be interconnected at various points along the vehicle drive train 600. For example, a hydrostatic motor may be interconnected near each wheel of the vehicle drive train 600 as part of an all-wheel-drive system.

In the configuration of FIG. 6, the dual pump/motor hybrid drive system 607 is primarily located between the transmission 203 and the drive wheel 202. As with the CVT 407' of FIG. 4B, such a configuration is particularly suitable for an application where the dual pump/motor hybrid drive system 607 is to be installed in an existing vehicle. Also similar to the CVT 407', the hydrostatic motor 601 may be coupled to the second shaft 102 through an overdrive arrangement. For example, in a relative low RPM system such as a diesel engine powered school bus, the hydrostatic motor 601 may be capable of operating at up to 800 RPM and may be coupled to the second shaft 102 through a 3:1 overdrive. Such an arrangement may allow the hydrostatic motor 601 to supply power to the drive wheel 202 through an RPM range of the second shaft 102 from about 0 to 2400 RPM. Other component arrangements, such as locating the rotational power distribution and control device 100 between the rotational power source 201 and transmission 203 are possible. Also, as with the aforementioned CVT 407, the single pump/motor hybrid drive system 507 may be configured by modifying an existing automatic transmission.

In the dual pump/motor hybrid drive system 607 of FIG. 6, the hydraulic fluid flow under pressure created by the hydrostatic pump 110 as it introduces resistance to the rotation of the ring gear 108 may be selectively divided between the energy storage apparatus 612 and the hydrostatic motor 601. Thus, the rotational power source 201 may be run at a rate where its efficiency is maximized. In situations where the power produced by the rotational power source 201 exceeds the demand, for example under light acceleration or steady state driving, much of the power flowing through the hydrostatic pump 110 may be directed toward the energy storage apparatus 612. As demand increases, more of the power flowing through the hydrostatic pump 110 may be directed toward the hydrostatic motor 601. Under heavy demand, the hydrostatic pump 110 may stop rotation of the ring gear 108 so that substantially all of the power produced by the rotational power source 201 may flow through the planetary carrier 104 to the sun gear 106 and to the drive wheel 202. Furthermore, energy from the energy storage apparatus 612 may be directed through a hydraulic fluid circuit 604 to the hydrostatic motor 601 to provide additional power to the vehicle drive train 600. Thus, it will be appreciated how a small fuel-efficient rotational power source 201 may be used relative to what may typically be used for a given vehicle size, with peak power demands being partially met by the stored energy in the energy storage apparatus 612.

As with the previously discussed embodiments, various components of the dual pump/motor hybrid drive system 607 may be positioned differently than as shown in FIG. 6. The dual pump/motor hybrid drive system 607 may operate in conjunction with or replace an existing manual transmission or automatic transmission.

In contrast to the single pump/motor hybrid drive system 507 of FIG. 5, the dual pump/motor hybrid drive system 607 of FIG. 6 may not have a disconnect mechanism between the rotational power distribution and control device 100 and the rotational power source 201. When no disconnect is present, and the vehicle drive train 600 is operating on energy from the energy storage apparatus 612, the rotational power source 201 may be off and not rotating, and therefore the planetary carrier 104 may be not rotating. Accordingly, the ring gear 108 attached to the hydrostatic pump 110 may be allowed to freewheel or the hydrostatic pump 110 may deliver additional power to the drive wheel 202. A brake may be employed on the output of the transmission 203, first shaft 101, to ensure that the planetary carrier 104 does not rotate. Alternatively, a disconnect mechanism may be employed and operated similarly to as discussed with reference to the hybrid drive system 507 of FIG. 5.

As with the single pump/motor hybrid drive system 507 of FIG. 5, the energy storage apparatus 612 may enable the vehicle drive train 600 to employ regenerative braking. However, in the dual pump/motor hybrid drive system 607 the hydrostatic pump 110 and the hydrostatic motor 601 may be individually or simultaneously used to employ regenerative braking to slow the vehicle.

When being powered by energy from the energy storage apparatus 612, the dual pump/motor hybrid drive system 607 may primarily deliver power to the drive wheel 202 through the hydrostatic motor 601. However, during high demand periods, with the rotational power source 201 off and the planetary carrier 104 stationary, power may also be delivered to the drive wheel 202 through the hydrostatic pump 110.

Generally, when the rotational power source 201 is running, the rotational power distribution and control device 100 may be dividing power between the drive wheel 202 and the hydraulic fluid circuit 604. Moreover, the hydraulic fluid circuit 604 may be dividing the power, in the form of flowing hydraulic fluid under pressure, from the rotational power distribution and control device 100 between the energy storage apparatus 612 for storage for later use and the hydrostatic motor 601 for immediate use in powering the vehicle drive train 600.

The dual pump/motor hybrid drive system 607 may be operable to, depending, for example, on power demand and stored energy levels, switch between powering the vehicle drive train 600 using the rotational power source 201, powering the vehicle using a combination of power from the rotational power source 201 and energy from the energy storage apparatus 612, and powering the vehicle drive train 600 using stored energy in the energy storage apparatus 612. Additionally, as with the single pump/motor hybrid drive system 507 of FIG. 5, by applying rotational power to the hydrostatic pump 110 while the rotational power source 201 is interconnected to the planetary carrier 104, the system may operate as an infinitely variable transmission.

Figure 10:
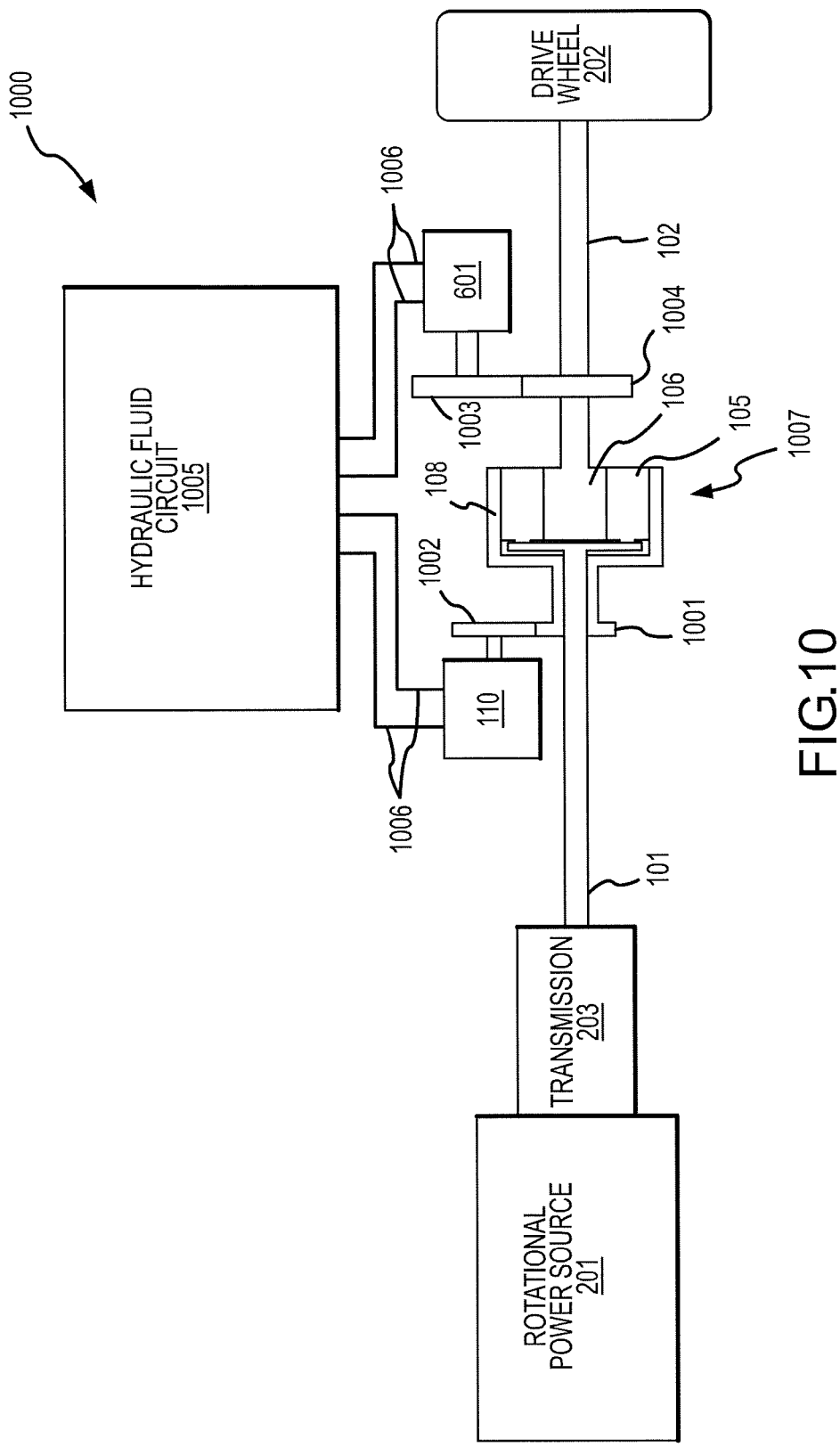
FIG. 10 is a schematic diagram of a variation of the embodiment of FIG. 6.

FIG. 10 schematically illustrates a variation of the dual pump/motor hybrid drive system 607 schematically illustrated in FIG. 6. In the dual pump/motor hybrid drive system 1000 of FIG. 10, the hydrostatic pump 110 is not located coaxial with the first shaft 101. The hydrostatic pump 110 is driven by a second hydrostatic pump drive gear 1002 that is in turn driven by a first hydrostatic pump drive gear 1001 rigidly interconnected to the ring gear 108. In this regard, the hydrostatic pump 110 is coupled to the ring gear 108 and is functionally similar to the arrangement illustrated in FIG. 6. Similarly, the hydrostatic motor 601 is driven by a second hydrostatic motor drive gear 1003 that is in turn driven by a first hydrostatic motor drive gear 1004 rigidly interconnected to the second shaft 102 (which is coupled to the sun gear 106). In this configuration, only the planetary gear set 1007, the first hydrostatic pump drive gear 1001 and the first hydrostatic motor drive gear 1004 are located between the first shaft 101 and the second shaft 102. The hydrostatic pump 110 and the hydrostatic motor 601 are offset from the planetary gear set 1007.

The hydrostatic pump 110 may be an axial piston pump and may have a fixed or variable angle swash plate. In the case of a variable angle swash plate, the angle of the swash plate may be controlled by a swash plate angle control unit attached to (or integrated with) the hydrostatic pump 110. The hydrostatic motor 601 may be an axial piston pump. The hydrostatic motor 601 may have a fixed or variable angle swash plate. The hydrostatic motor 601 may be a radial piston pump. Both the hydrostatic pump 110 and the hydrostatic motor 601 may be interconnected to a hydraulic circuit 1005 via hydraulic fluid lines 1006. An energy storage apparatus (not shown) may be interconnected to the dual pump/motor hybrid drive system 1000 of FIG. 10.

The above-described embodiments generally incorporate hydraulic fluid as an operating fluid. However, the rotational power distribution and control system may use gases as the operating fluid. In such a system, pneumatic motors and pumps would perform the functions of the above-described hydraulic motors and pumps.

The aforementioned energy storage apparatuses may be any apparatuses known to those skilled in the art capable of storing energy flowing from a hydraulic pump in the form of a hydraulic fluid flow under pressure. For example, the aforementioned energy storage apparatuses may be accumulators such as bladder-type and/or piston-type accumulators known to those skilled in the art. The aforementioned energy storage apparatuses may include a single accumulator or multiple accumulators.

Figure 7:
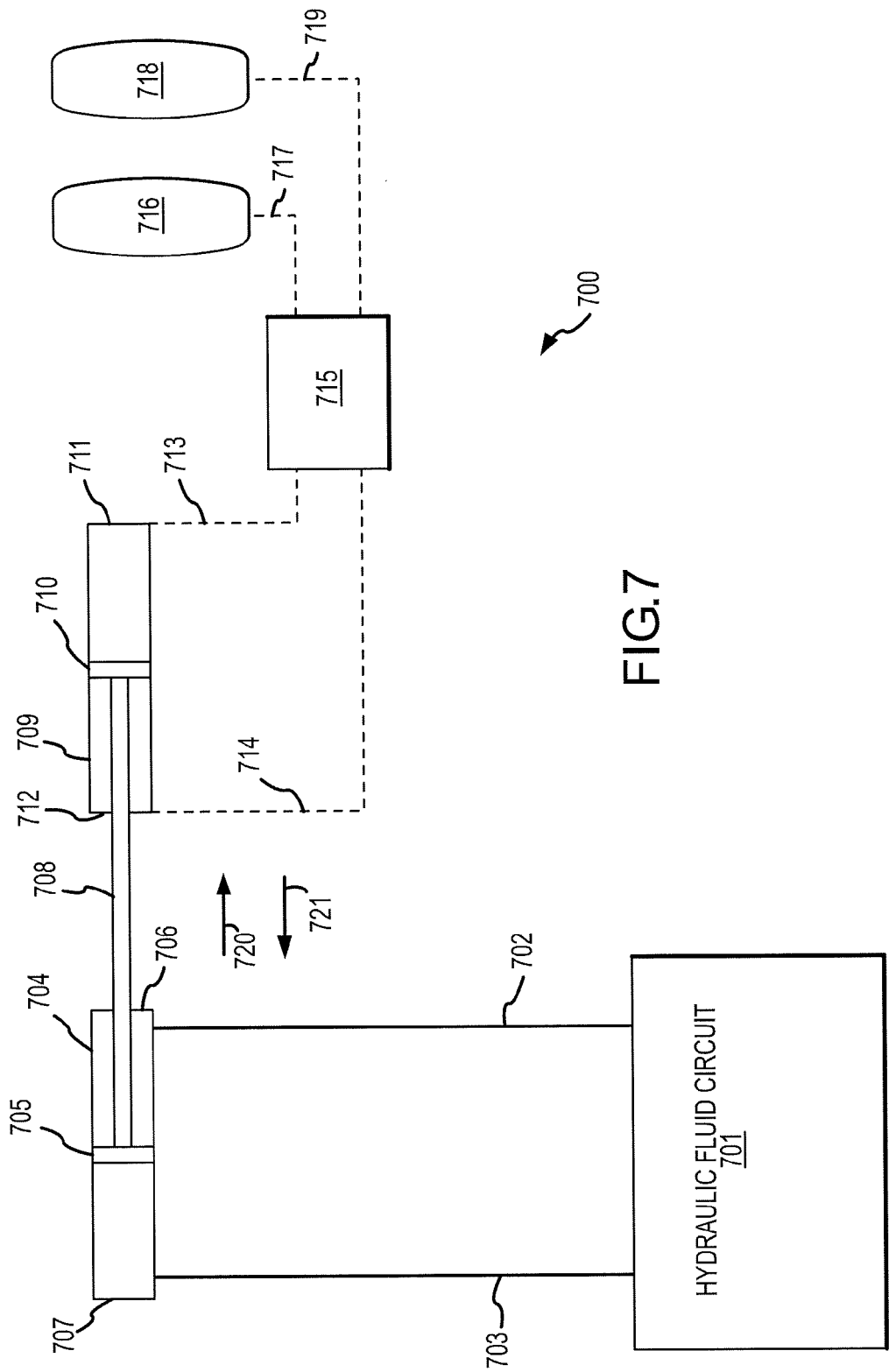
FIG. 7 is a schematic diagram of one embodiment of an energy storage apparatus for use in a hybrid drive system.

FIG. 7 schematically illustrates an energy storage apparatus 700 that may be used in place of any of the aforementioned energy storage apparatuses. The energy storage apparatus 700 may be used as described herein or it may be used in conjunction with known types of accumulators. One advantage of the energy storage apparatus 700 over typical accumulators is that the energy storage apparatus 700 is operable to produce a net flow of hydraulic fluid that is greater than the volume of hydraulic fluid in the hydraulic system. For example, if a typical piston type accumulator has a hydraulic fluid capacity of the 5 gallons, that accumulator may only be capable of supplying a net flow of at most 5 gallons. In contrast, as described below, the energy storage apparatus 700 may be operable to cause a net flow of hydraulic fluid that is greater than the volume of a hydraulic cylinder 704 used to store energy. In vehicular applications, fuel efficiency is related to vehicular weight. Therefore, it is advantageous to incorporate an energy storage apparatus that uses relatively smaller quantities of hydraulic fluid.

A hydraulic fluid circuit 701 of FIG. 7 may be any of the hydraulic fluid circuits previously discussed in relation to the aforementioned rotational power distribution and control devices, CVTs, and hybrid drive systems. The energy storage apparatus 700 may be interconnected to the hydraulic fluid circuit 701 through at least two hydraulic lines: a first hydraulic line 702 and a second hydraulic line 703. The hydraulic fluid circuit 701 is operable to direct a flow of hydraulic fluid from, for example, the high-pressure output of a rotational power distribution and control device 100 to either the first hydraulic line 702 or the second hydraulic line 703. Similarly, when the energy storage apparatus 700 is releasing energy to drive the vehicle, the hydraulic fluid circuit 701 is operable to direct a flow of hydraulic fluid from the energy storage apparatus 700 to a hydrostatic motor.

The first and second hydraulic lines 702 and 703 are interconnected to the hydraulic cylinder 704. Also present is a pneumatic cylinder 709. A piston 705 of the hydraulic cylinder 704 is interconnected with a piston 710 of the pneumatic cylinder 709 through a cylinder rod 708. Both the hydraulic cylinder 704 and the pneumatic cylinder 709 are two-way cylinders. The pneumatic cylinder 709 is interconnected to a pneumatic circuit 715 through a first pneumatic line 713 and a second pneumatic line 714. In turn, the pneumatic circuit 715 is pneumatically interconnected to a high-pressure storage device 716 via a high-pressure storage device pneumatic line 717. The pneumatic circuit 715 is also pneumatically interconnected to a low-pressure storage device 718 via a low-pressure storage device pneumatic line 719. The pneumatic cylinder 709, the pneumatic circuit 715, and high and low-pressure storage devices 716 and 718, respectively, may together form a closed system. The system may be filled with a relatively inert gas such as nitrogen.

The pneumatic circuit 715 is operable to connect either pneumatic line 713, 714 (connected to the pneumatic cylinder 709) to either storage device pneumatic line 717, 719 (connected to the high-pressure storage device 716 and the low-pressure storage device 718, respectively). The pneumatic circuit 715 may also include valves to further control the flow between the pneumatic lines 713, 714, 717, and 719 attached to it.

The schematic illustration of FIG. 7 contains one hydraulic cylinder 704 and one pneumatic cylinder 709. However, multiple cylinders may be used. For example, two hydraulic cylinders 704 may be interconnected to a single pneumatic cylinder 709. Similarly, multiple high and low pressure storage devices 716 and 718 may be used. The size and number of cylinders and storage devices in a particular application may depend on vehicle size and weight, available room within the vehicle, the maximum amount of energy desired to be stored, or any other relevant factor or combination of factors.

The energy storage apparatus 700 is operable to store and release energy as required by the vehicle in which it is incorporated. When the amount of energy being produced by the rotational power source 201 of the vehicle exceeds the amount of energy needed to propel and operate the vehicle (or when regenerative braking is occurring), the excess energy may be stored in the energy storage apparatus 700. This may be accomplished, for example, by the hydraulic fluid circuit 701 directing the hydraulic flow from a pump (e.g. the hydrostatic pump 110 of a rotational power distribution and control device 100) through the second hydraulic line 703. The hydraulic fluid will flow into a second end 707 of the hydraulic cylinder 704 and impart a force on the piston 705 of the hydraulic cylinder 704. The hydraulic fluid circuit 701 may simultaneously connect the first hydraulic line 702 to a reservoir or other hydraulic fluid holding apparatus within the hydraulic fluid circuit 701 so that effectively there is little or no resistance in the hydraulic cylinder 704 caused by the hydraulic fluid in a first end 706 of the hydraulic cylinder 704. In the configuration of FIG. 7, this will result in a net force on the piston 705 in the direction of an arrow 720.

Consequently, a net force in the direction of the arrow 720 will be imparted on the piston 710 of the pneumatic cylinder 709 since the piston 705 and piston 710 are interconnected by the cylinder rod 708. To store energy, the pneumatic circuit 715 may connect the first pneumatic line 713 to the high-pressure storage device pneumatic line 717. Thus a first end 711 of the pneumatic cylinder 709 experiencing compressive forces will be pneumatically interconnected to the high-pressure storage device 716. In this regard, energy of the flow of hydraulic fluid through the second hydraulic line 703 to the hydraulic cylinder 704 may be stored in the form of pressurized gas in the high-pressure storage device 716. As the piston 710 is being moved in the direction of the arrow 720, the second pneumatic line 714 may be interconnected through the pneumatic circuit 715 to the low-pressure storage device pneumatic line 719.

To continue storing energy once the pistons 705 and 710 reach their respective cylinder ends 706 and 711, the hydraulic and pneumatic connections may be reconfigured. Thus at this point, the hydraulic fluid circuit 701 may swap the connections of hydraulic lines 702 and 703 so that the first hydraulic line 702 is interconnected to the high-pressure output of, for example, the rotational power distribution and control device 100. Now the force on piston 705 is reversed and the piston 705 may begin to move in the direction of an arrow 721. At least substantially simultaneously with the switching of the hydraulic lines 702 and 703, the pneumatic circuit 715 may swap the interconnections of the pneumatic lines 713, 714, 717 and 719. The pneumatic circuit 715 may interconnect the first pneumatic line 713 with the low-pressure storage device pneumatic line 719 and the second pneumatic line 714 with the high-pressure storage device pneumatic line 717. In this regard, movement of the piston 710 of the pneumatic cylinder 709 may result in additional gas being compressed and stored in the high-pressure storage device 716.

As described above, with the piston 710 at the first end 711 of the pneumatic cylinder 709, interconnecting the second pneumatic line 714 with the high pressure storage device 716 may allow gas to flow from the high-pressure storage device 716 into a second end 712 of the pneumatic cylinder 709. Such a flow may be prevented by a valve or other device within the pneumatic circuit 715 configured to only allow a flow of gas from the second end 712 of the pneumatic cylinder 709 to the high-pressure storage device 716 and not vice versa. Several such devices may be present in the pneumatic circuit 715 to selectively prevent undesired gas flow between components at various points in the energy storage and energy release processes.

Once the hydraulic fluid circuit 701 and the pneumatic circuit 715 have been reconfigured as described, additional energy will be stored in the form of additional pressurized gas as the pistons 705 and 710 move in the direction of the arrow 721. When the pistons 705 and 710 reach their respective ends 707 and 712 of the respective cylinders 704 and 709, the hydraulic fluid circuit 701 and pneumatic circuit 715 may again be reconfigured so that additional piston 705 and 710 movement in the direction of the arrow 720 will result in additional energy storage in a form of additional pressurized gas in the high-pressure storage device 716. This process of moving the pistons 705 and 710 back-and-forth to store energy may continue until a predetermined amount of energy is stored. In one embodiment, energy is stored until the pressure of the nitrogen gas within the high-pressure storage device 716 reaches 6000 psi.

As may be appreciated, the energy storage apparatus 700 may be operable to store significant amounts of energy using relatively smaller volumes of hydraulic fluid when compared to typical piston-type or bladder-type accumulators. Additionally, when the vehicle in which the energy storage apparatus 700 is installed is not in use, an alternate method of charging the high-pressure storage device 716 may be utilized. For example, in a consumer vehicle application, an electrically powered auxiliary compressor within the pneumatic circuit 715 may be present. The vehicle operator may, for example, connect the compressor to a power outlet and allow the compressor to charge the high-pressure gas storage device 716 overnight so that the high-pressure storage device 716 is fully charged when the operator first uses the vehicle the next morning. In this regard, relatively inexpensive electricity can be used to at least partially power the vehicle.

To release energy from the energy storage apparatus 700 and operate the vehicle, at least partially, on the energy stored within the energy storage apparatus 700, a procedure generally opposite to the one described in regards to energy storage may be performed. Referring to the positions of components as illustrated in FIG. 7 as an initial state, this may be accomplished, for example, by the pneumatic circuit 715 interconnecting the high-pressure storage device 716 to the first end 711 of the pneumatic cylinder 709. At substantially the same time, the low-pressure storage device 718 may be pneumatically interconnected to the second end 712 of the pneumatic cylinder 709. The high-pressure gas will in turn impart a force on the piston 710 in the direction of the arrow 721. This will in turn impart a compressive force on the hydraulic fluid in the second end 707 of the hydraulic cylinder 704. The hydraulic fluid circuit 701 may interconnect the second hydraulic line 703 with a hydrostatic motor in the vehicle in such a manner that the flow of hydraulic fluid through the second hydraulic line 703 may power the hydrostatic motor and therefore propel the vehicle. In a similar manner, the flow of hydraulic fluid may be used to start the internal combustion engine or operate other devices and/or accessories of the vehicle.

Once the pistons 705 and 710 reach their respective cylinder ends 707 and 712, the hydraulic and pneumatic interconnections may be reconfigured so that piston 705 and 710 movement in the direction of the arrow 720 may result in the release of additional energy from the energy storage apparatus 700. This released energy may then be used to continue to propel the vehicle. This process of moving the pistons 705 and 710 back-and-forth to release energy may continue until a predetermined amount of energy is released or the pressure in the high pressure storage device 716 reaches a predetermined level.

Figure 9:
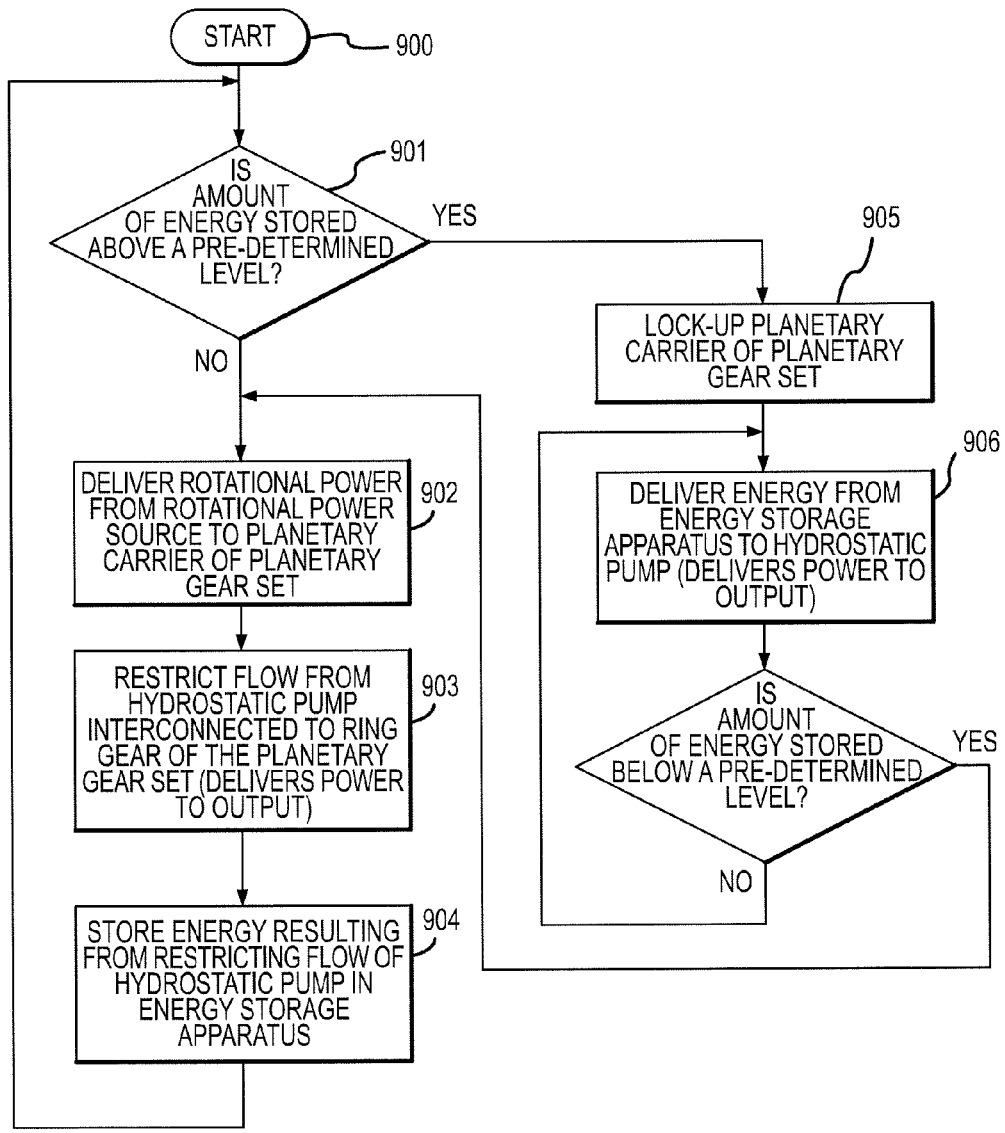
FIG. 9 is a flowchart directed to one embodiment of a method for transmitting rotational power from a rotational power source to a load.

FIG. 9 illustrates a methodology of transmitting rotational power from a rotational power source to a load. The illustration is in the form of a flowchart wherein a first step 900 is to start the system. This may be accomplished, for example, in a vehicle by turning a key to an "On" position or pressing a start button. Once turned on, the vehicle, via a microprocessor and software or other logic devices, may determine by step 901 if the amount of energy stored in an energy storage apparatus is above a predetermined level. If the amount of energy stored is below a predetermined level and an operator initiates forward movement (for example by depressing an accelerator pedal), the power to drive the vehicle may be delivered from a rotational power source to a planetary carrier within a planetary gear set by step 902. A next step 903 may be to restrict hydraulic fluid flow from a hydrostatic pump coupled to the ring gear of the planetary gear set. This restriction of flow may result in a resistance to rotation being imparted on the ring gear, which in turn may result in a torque being applied to a sun gear of the planetary gear set. The sun gear may be interconnected to a drive wheel of the vehicle and when the torque applied to the sun gear becomes greater than the resistive torque of the vehicle, the vehicle will begin to move and power will be divided between the hydrostatic pump in the drive wheel. The power flowing through the hydrostatic pump may be stored in an energy storage apparatus by step 904. In the dual pump/motor hybrid drive system of FIG. 6, the power flowing through the hydrostatic pump may be stored in the energy storage apparatus, used to power the vehicle, or any combination thereof.

The process of powering the vehicle and storing energy may continue until the amount of energy stored is determined to be above a predetermined level through execution of step 901. This is illustrated in the flowchart of FIG. 9 by the loop including steps 901, 902, 903 and 904.

Once the amount of energy stored is above a predetermined level, the next step may be to power the vehicle using the energy stored in the energy storage apparatus. In a single pump/motor hybrid drive system such as that described previously with respect to the FIG. 5, this may be accomplished by locking up the planetary carrier of the planetary gear set through execution of step 905 and then delivering energy from the energy storage apparatus to the hydrostatic pump coupled to the ring gear of the planetary gear set through execution of step 906. With the planetary carrier locked up, delivery of power to the ring gear will result in power being delivered to the sun gear and hence to the drive wheel. Alternatively, in a dual pump/motor hybrid drive system, such as that described previously with respect to FIG. 6, step 905 may not be present and power may be delivered directly to the drive wheel through the hydrostatic motor interconnected to the drive wheel.

In either the single pump/motor or dual pump/motor configuration, power delivery from the energy storage device may continue until the amount of energy stored is below a predetermined level, as determined through step 907. Once the energy stored drops below a predetermined level, the rotational power source may be started or reengaged to deliver power to the planetary carrier by step 902. This is illustrated in the flowchart of a FIG. 9 by the connection between the decision block 907 and the loop including steps 901, 902, 903 and 904. The method of the flowchart continues until the operator turns the vehicle off, which may occur during any step of the flowchart.

As previously discussed many of the features described above in relation to the specific configurations of the rotational power distribution and control system may be incorporated into various other configurations of rotational power distribution and control systems. For example, with respect to FIG. 2, the charge pump 204, separate from the hydrostatic pump 110, was described while the system of FIG. 4B utilized the hydrostatic pump 110 with an integrated charge pump. It is intended that such design choices with respect to the features of various configurations are for exemplary purposes and that any of the systems described may use a separate charge pump or an integrated charge pump. Additionally, although all of the systems schematically illustrated within a vehicle are shown and described incorporating the planetary gear set 107 similar to as shown in FIG. 1, any of these systems may incorporate a rotational power distribution and control device with a differential gear set such as shown in FIG. 3. Also, with respect to systems using planetary gear sets, the systems may be configured such that two components of the planetary gear set may be locked relative to each other, which in turn will result in the entire planetary gear set being locked-up. For example, if in the rotational power distribution and control device 100 of FIG. 1, the ring gear 108 is locked relative to the plurality of planetary gears 105, the gear ratio between the first shaft 101 and the second shaft 102 will be one to one. This is similar to the operation and control of planetary gear sets in automatic transmissions known to those skilled in the art.

The foregoing description of the present invention has been presented for purposes of illustration and description. Furthermore, the description is not intended to limit the present invention to the form disclosed herein. Consequently, variations and modifications commensurate with the above teachings, and skill and knowledge of the relevant art, are within the scope of the present invention. The embodiments described hereinabove are further intended to explain best modes known of practicing the present invention and to enable others skilled in the art to utilize the present invention in such, or other embodiments and with various modifications required by the particular application(s) or use(s) of the present invention. It is intended that the appended claims be construed to include alternative embodiments to the extent permitted by the prior art.

What is claimed is:

1. A rotational power distribution and control system comprising:
   (a) a gear set wherein said gear set comprises:
      (i) a first rotational interface;
      (ii) a second rotational interface; and
      (ii) a third rotational interface;
   (b) a hydrostatic pump coupled to a selected rotational interface in the form of one of said first rotational interface, said second rotational interface and said third rotational interface; a cylinder block of said hydrostatic pump being coupled to one of said gear set;
   (c) a hydraulic fluid circuit wherein said hydraulic fluid circuit is interconnected to a first port on said hydrostatic pump, wherein said hydraulic fluid circuit is interconnected to a second port on said hydrostatic pump; and
   (d) a valve to selectively control flow through said first port on said hydrostatic pump.

2. The rotational power distribution and control system of claim 1, wherein said cylinder block of said hydrostatic pump is interconnected to said third rotational interface.

3. The rotational power distribution and control system of claim 2, wherein said hydrostatic pump further comprises a housing with a first end and a second end opposed to said first end, wherein said hydrostatic pump is an axial piston pump comprising a plurality of axially movable pistons and an angled swash plate, wherein said plurality of pistons are disposed to slideably interface with said angled swash plate, wherein said angled swash plate is rigidly interconnected to said housing,
   wherein said first rotational interface is a first shaft extending through said first end and said second end of said housing, wherein said first shaft is rotatable relative to said housing, wherein said second rotational interface is a second shaft rotatable relative to said housing, wherein said second shaft is collinear with said first shaft, wherein said third rotational interface is a hollow shaft extending through said second end of said housing, wherein said hollow shaft is rotatable relative to said housing, wherein said hollow shaft is coaxial with said first shaft, wherein said hollow shaft is operable to rotate independently from said first shaft.

4. The rotational power distribution and control system of claim 3, wherein said hydraulic fluid circuit is a closed circuit, wherein said housing comprises a leaked fluid return path interconnected to said hydraulic fluid circuit and an interior volume of said housing.

5. A rotational power distribution and control system comprising:
 (a) a gear set wherein said gear set comprises:
  (i) a first rotational interface;
  (ii) a second rotational interface; and
  (ii) a third rotational interface;
 said gear set including a carrier, wherein said carrier is said first rotational interface; a first gear coupled to said second rotational interface; and a second side gear coupled to said third rotational interface:
 (b) a hydrostatic pump coupled to a selected rotational interface in the form of one of said first rotational interface, said second rotational interface and said third rotational interface; a cylinder block of said hydrostatic pump being coupled to one of said first gear and said second side gear;
 (c) a hydraulic fluid circuit wherein said hydraulic fluid circuit is interconnected to a first port on said hydrostatic pump, wherein said hydraulic fluid circuit is interconnected to a second port on said hydrostatic pump; and
 (d) a valve to selectively control flow through said first port on said hydrostatic pump.

6. A method of transmitting rotational power from a rotational power source to a load comprising;
 delivering rotational power to a first element of a gear set, wherein a load is coupled to a second element of said gear set; and
 restricting flow from a hydrostatic pump coupled to a third element of said gear set,
 wherein said hydrostatic pump comprises a plurality of reciprocating pistons,
 wherein said restricted flow causes rotational resistance to be applied to said third element of said gear set,
 wherein said rotational resistance results in transfer of rotational power from said first element to said second element.

7. The method of rotational power from a rotational power source to a load of claim 6, wherein said gear set is a planetary gear set.

8. The method of transmitting rotational power from a rotational power source to a load of claim 7, wherein said third element is a ring gear of said planetary gear set.

9. The method of rotational power from a rotational power source to a load of claim 7, further comprising;
 selectively directing said restricted flow to an energy storage apparatus; and selectively releasing energy from said energy storage apparatus to said hydrostatic pump.

10. The method of transmitting rotational power from a rotational power source to a load of claim 6, wherein said gear set is a differential gear set.

* * * * *